US011753019B2

(12) United States Patent
Samarthyam et al.

(10) Patent No.: US 11,753,019 B2
(45) Date of Patent: Sep. 12, 2023

(54) EVENT DETERMINATION FOR VEHICLES AND OCCUPANTS OF MOBILITY PROVIDER ON MAAS PLATFORM

(71) Applicant: SONY GROUP CORPORATION, Tokyo (JP)

(72) Inventors: Santhosh Samarthyam, Bangalore (IN); Madhvesh Sulibhavi, Bangalore (IN)

(73) Assignee: SONY GROUP CORPORATION, Tokyo (JP)

( * ) Notice: Subject to any disclaimer, the term of this patent is extended or adjusted under 35 U.S.C. 154(b) by 326 days.

(21) Appl. No.: 17/106,666

(22) Filed: Nov. 30, 2020

(65) Prior Publication Data
US 2022/0169258 A1 Jun. 2, 2022

(51) Int. Cl.
*B60W 40/09* (2012.01)
*H04W 4/40* (2018.01)
*G06N 3/08* (2023.01)
*G07C 5/00* (2006.01)

(52) U.S. Cl.
CPC .............. *B60W 40/09* (2013.01); *G06N 3/08* (2013.01); *G07C 5/008* (2013.01); *H04W 4/40* (2018.02); *B60W 2540/043* (2020.02); *B60W 2556/45* (2020.02); *B60W 2756/10* (2020.02)

(58) Field of Classification Search
CPC ........... B60W 40/09; B60W 2540/043; B60W 2756/10; B60W 2556/45; H04W 4/40; G06N 3/08; G07C 5/008
See application file for complete search history.

(56) References Cited

U.S. PATENT DOCUMENTS

| 10,198,772 | B2 | 2/2019 | Parameshwaran | |
| 2014/0324482 | A1* | 10/2014 | Wallach | G06Q 40/08 705/4 |
| 2017/0287322 | A1* | 10/2017 | Drake | E05F 15/77 |
| 2020/0094737 | A1 | 3/2020 | Furukawa | |
| 2020/0104876 | A1* | 4/2020 | Chintakindi | A61B 5/1112 |

(Continued)

FOREIGN PATENT DOCUMENTS

| CN | 210038487 U | 2/2020 |
| KR | 10-1887268 B1 | 8/2018 |
| WO | 2018/180347 A1 | 10/2018 |

*Primary Examiner* — Behrang Badii
*Assistant Examiner* — Jay Khandpur
(74) *Attorney, Agent, or Firm* — CHIP LAW GROUP

(57) ABSTRACT

A mobility player system including memory and a processor is provided. The memory stores a trained AI model. The processor receives on-board diagnostic (OBD) data associated with a first vehicle registered with a first mobility provider. The processor receives occupant data, different from the OBD data, from plurality of sensors associated with the first vehicle. The processor determines a plurality of parameters based on the received OBD data and the received occupant data. The processor applies the trained AI model on the plurality of parameters. The processor determines one or more events related to the first vehicle, or related to an occupant of the first vehicle, based on the application of the trained AI model on the plurality of parameters. The processor transmits information about the determined one or more events to one or more nodes of a distributed ledger associated with a Mobility-as-a-Service (MaaS) network.

20 Claims, 9 Drawing Sheets

(56) References Cited

U.S. PATENT DOCUMENTS

| | | | |
|---|---|---|---|
| 2020/0106678 A1* | 4/2020 | Grill | H04L 41/142 |
| 2020/0320882 A1* | 10/2020 | Fujii | G08G 1/123 |
| 2021/0136572 A1* | 5/2021 | Ingraham | H04W 12/65 |
| 2021/0271517 A1* | 9/2021 | Guim Bernat | G06F 9/505 |
| 2022/0119004 A1* | 4/2022 | Avadhanam | B60W 60/005 |
| 2022/0277332 A1* | 9/2022 | Hsu-Hoffman | G06Q 30/0207 |

* cited by examiner

500A

| Events/Parameters | Weights | Plurality Of First Scores | First Score (Normal Conditions) |
|---|---|---|---|
| 1. Driving Pattern:<br><br>1. Smooth Driving Pattern<br>- Depends On RPM, Throttle Position And Engine Load Parameters | 0.4 | 6 | 21.6 |
| 2. Efficiency Of Driving:<br>- Depends On Acceleration And Braking Parameters | 0.3 | 5.8 | |
| 3. Driver Aggression:<br>- Depends On Overtaking Distance, Intimidation, Braking Distance, Acceleration And Deceleration | 0.8 | 7 | |
| 2. Adhering To Driving Safety:<br><br>Depends On Seatbelt Usage, Drunken Driving Parameter, Overcapacity, Traffic Regulation Adherence | 0.9 | 9 | |
| 3. Driver Behavior:<br><br>Depends On Drunken Driving Parameter, Traffic Regulation Adherence, Rash Driving, Speaking Loudly On Phone, Playing Loud Music | 0.6 | 6.4 | |

| Events/Parameters | Weights | Plurality Of First Scores | First Score (Hazardous Conditions) |
|---|---|---|---|
| 1. Driving Pattern: <br><br> 1. Smooth Driving Pattern | 0.3 | 5 | 20.2 |
| 2. Efficiency Of Driving | 0.4 | 8 | |
| 3. Driver Aggression | 0.2 | 4 | |
| 4. Hazardous Patterns: <br> -depends On Less Visibility (fog, Rain), Road Conditions (slippery), Abrupt Route | 0.5 | 8.2 | |
| 2. Adhering To Driving Safety: <br><br> Depends On Seatbelt Usage, Drunken Driving Parameter, Overcapacity, Traffic Regulation Adherence | 0.9 | 6 | |
| 3. Driver Behavior: <br><br> Depends On Drunken Driving Parameter, Traffic Regulation Adherence, Rash Driving, Speaking Loudly On Phone, Playing Loud Music | 0.7 | 7.5 | |

| Events/Parameters | Weights | Plurality Of Second Scores | Second Score |
|---|---|---|---|
| 1. Passenger Travelling Information:<br><br>Depends On Frequency Of Trips, Type Of Vehicle Booked, Area Of Travel | 0.4 | 7 | 10.3 |
| 2. Adhering To Safety:<br><br>Depends On Seatbelt Usage, Traffic Regulation Adherence | 0.6 | 5 | |
| 3. Passenger Behavior:<br><br>Depends On Speaking Loudly On Phone, Playing Loud Music | 0.5 | 9 | |

FIG. 5C

EVENT DETERMINATION FOR VEHICLES AND OCCUPANTS OF MOBILITY PROVIDER ON MAAS PLATFORM

REFERENCE

None.

FIELD

Various embodiments of the disclosure relate to Mobility-as-a-Service (MaaS) technology. More specifically, various embodiments of the disclosure relate to a system and method for event determination for vehicles and occupants of mobility providers on a MaaS platform.

BACKGROUND

Recent advancements in technologies related to fleet management has led to development of mobility providers to manage or track vehicles. The mobility player may manage and track the vehicles to assign trips requested from various passengers through different applications. Typically, the mobility provider may assign the trip to the vehicle based on a current location of the vehicle and a source location of a passenger, who may request a ride to a certain destination location. In certain situations, the assignment of the vehicle for the trip may not consider other factors that may be desirable for the passenger. Examples of such factors may include, but are not limited to, a preference of the passenger, safety or privacy concerns, regulatory compliance, or disputing handling. Thus, there is a need for a system that may ensure efficient, secure, compliant, and profitable fleet operations associated with the mobility providers.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method for event determination for vehicles and occupants of mobility providers on a Mobility-as-a-Service (MaaS) platform, are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIGS. 5A-5C collectively illustrate exemplary tables for generation of a score card for an occupant of a vehicle, in accordance with an embodiment of the disclosure.

DETAILED DESCRIPTION

Figure 1:
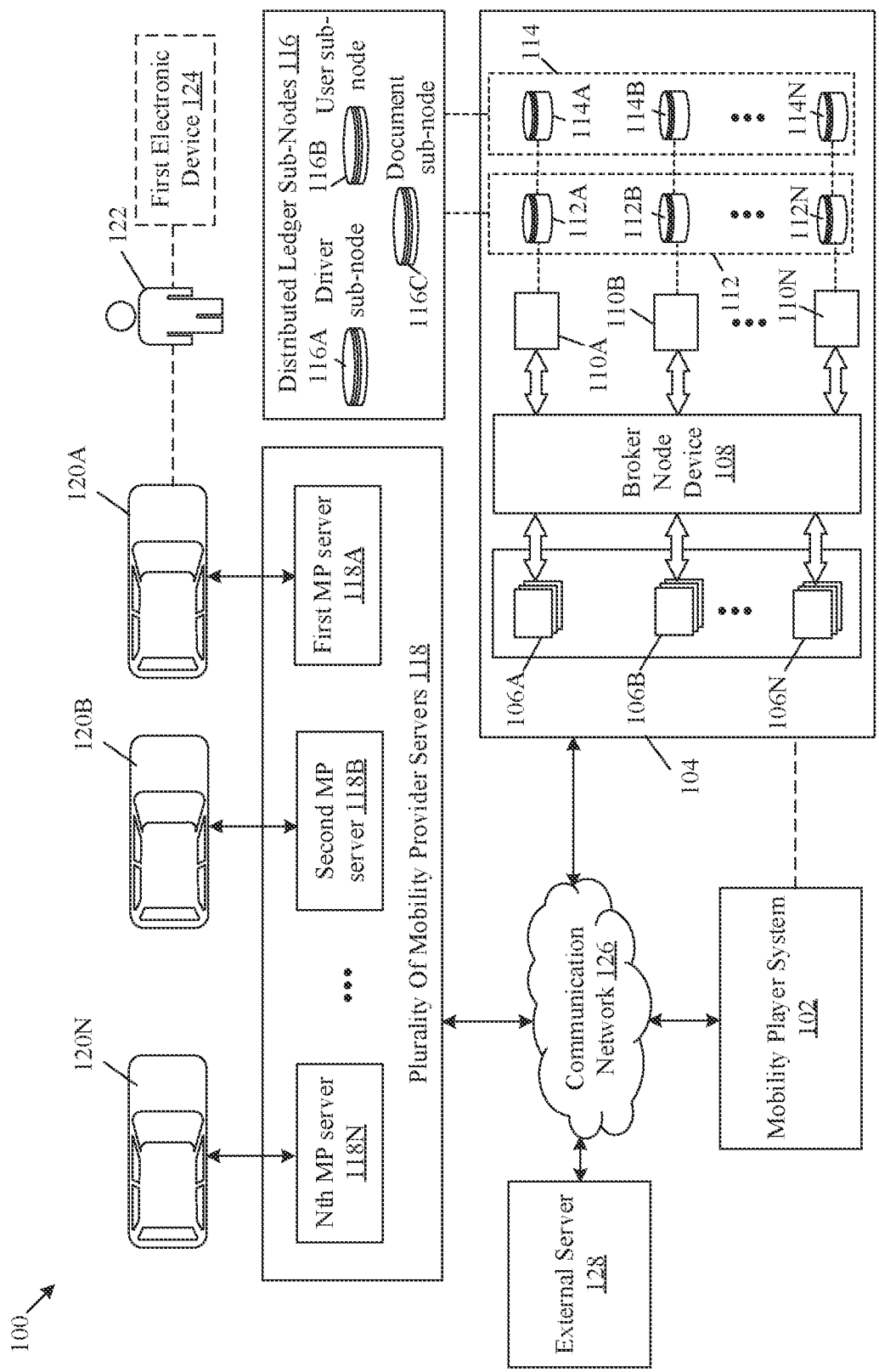
FIG. 1 is a diagram of an exemplary network environment for event determination for vehicles and occupants of mobility providers on a Mobility-as-a-Service (MaaS) network, in accordance with an embodiment of the disclosure.

The following described implementations may be found in the disclosed system and method for event determination for vehicles and occupants of mobility providers on a Mobility-as-a-Service (MaaS) network. The disclosed system may be a part of a federated transportation management system that may facilitate multiple homogeneous or heterogenous transportation providers (such as mobility providers) and their infrastructure, such as rental vehicles, ticketing gates, applications, and/or Point of Sale (PoS) devices to operate on the MaaS network to provide various transportation services (such as cab services). Each transportation provider may enjoy secure data ownership and may control co-use of relevant transaction data through the distributed ledger. This may enhance connectivity between the various transportation providers.

Exemplary aspects of the disclosure provide a mobility player system configured to store a trained artificial intelligence (AI) model including at least one of one or more machine learning models or one or more neural network model. The mobility player system may be configured to receive data, such as on-board diagnostic (OBD) data and occupant data associated with a first vehicle. For example, the occupant data may include data received from sensors, such as an imaging sensor, an audio sensor, and a LIDAR sensor associated with the first vehicle. The first vehicle may be registered with a first mobility provider. The mobility player system may be further configured to determine a plurality of parameters based on the received OBD data and the occupant data. Examples of the plurality of parameters may include, but are not limited to, acceleration/deacceleration information of the first vehicle determined from the OBD data, a usage of seat belt by the occupant of the first vehicle determined from the occupant data, an overcapacity of occupants in the first vehicle determined from the occupant data, an adherence to traffic rules by the occupant of the first vehicle, a health status of the first vehicle, and/or weather conditions related to the route of the first vehicle.

The mobility player system may be further configured to apply the trained AI model on the plurality of parameters to determine (or predict) one or more events related to the first vehicle or related to an occupant of the first vehicle. Examples of the one or more events may include, but are not limited to, an aggression behavior of a driver (such as driving behavior), an adherence to safe driving practices by the driver of the first vehicle, an adherence to regulatory policies by the driver of the first vehicle, a comfort level provided to a passenger of the first vehicle, a hazardous driving conditions, or a rash driving pattern of the driver.

The information about the determined one or more events may be stored on one or more nodes of a distributed ledger associated with the MaaS network. Therefore, the mobility player system may allow prevention of accidents based on determination (or prediction) of events that may lead to accidents or instances, such as vehicle breakdown, hazardous driving conditions, rash driving by the driver, passenger dissatisfaction, disputes, regulatory violations, and so forth. The mobility player system may further, allow safe operations of the first vehicle as well as provide safety to the occupants (such as driver or passenger) of the first vehicle.

In accordance with an embodiment, the mobility player system may further be configured to generate driver profile information associated with the driver of the first vehicle, based on the determined one or more events. For example, the generated driver profile information may include but is not limited to, driving pattern (such as average speed of driving of the driver), behavior of the driver with the passengers, a level of driving skills of the driver. Moreover, the mobility player system may further be configured to generate passenger profile information associated with the passenger of the first vehicle. For example, the generated passenger profile information may include but is not limited to, an average route of trip preferred by the passenger, a speed of driving preferred by the passenger, a type of vehicle preferred by the passenger, a type of account (such as a premium account) of the passenger, and a behavior of the passenger with the driver. The mobility player system may analyze the driver profile information and the passenger profile information to assign a vehicle and a driver to the passenger for a trip registered with a particular mobility player. Therefore, based on the analysis, the mobility player system may provide customized services to the passenger (such as a customer of a mobility provider) that may further enhance passenger satisfaction, ensure safety for the passenger. and further ensure profitability for the plurality of mobility providers based on the provided customized services.

The mobility player system may be configured to generate a first score card associated with the driver. The mobility player system may further generate a second score card associated with the passenger. The first score card and the second score card may indicate a behavioral pattern of the driver and the passenger respectively. The first score card and the second score card may be generated by the mobility player system based on aggregation (such as a weighted aggregation) of multiple events determined based on real-time OBD data and the occupant data received under different conditions (such as normal or hazardous).

The mobility player system may further store the driver profile information and the passenger profile information (i.e. generated based on one or more events) on a distributed ledger, thereby ensuring information security and privacy to the customers (such as the passengers). The mobility player system may provide effective handling of disputes that may occur between the passengers, drivers, or the mobility providers, by utilizing the driver profile information and the passenger profile information stored on the distributed ledger. Moreover, the mobility player system may enable the plurality of mobility providers to utilize authorized information (such as the profile information) stored on the distributed ledger on the MaaS network to devise different service models that may provide monetary benefits to the plurality of mobility providers. Thus, the mobility player system of the present disclosure may ensure efficient, secure, and profitable fleet operations associated with the plurality of mobility providers.

FIG. 1 is a diagram of an exemplary network environment for event determination for vehicles and occupants of mobility providers on a Mobility-as-a-Service (MaaS) platform, in accordance with an embodiment of the disclosure. With reference to FIG. 1, there is shown a block diagram of a network environment 100. The network environment 100 may include a mobility player system 102. The network environment 100 may further include Mobility-as-a-Service (MaaS) network 104, which may be associated with a publish-subscribe pattern. The MaaS network 104 may include a plurality of publisher nodes 106A-106N, a broker node device 108, and a plurality of subscriber nodes 110A-110N. The MaaS network 104 may further include a plurality of mobility provider (MP) nodes 112A-112N and a plurality of MaaS nodes 114A-114N. Moreover, the MaaS network 104 may include distributed ledger sub-nodes 116 that may include a driver sub-node 116A, a user sub-node 116B, and a document sub-node 116C.

The network environment 100 may further include a plurality of mobility provider (MP) servers 118. The plurality of MP servers 118 may include a first MP server 118A, a second MP server 118B, . . . and an Nth MP server 118N. Moreover, the network environment 100 may include a first vehicle 120A associated with the first MP server 118A, a second vehicle 120B associated with the second MP server 118B, . . . and an Nth vehicle 120N associated with the Nth MP server 118N. The network environment 100 may further include an occupant 122 of the first vehicle 120A and a first electronic device 124 associated with the occupant 122, and an external server 128. Moreover, the network environment 100 may include a communication network 126.

In FIG. 1, the number of nodes of the MaaS network 104, the number of MP servers in the plurality of MP servers 118, and the number of vehicles 120A-120N are merely presented as an example and should not be construed as limiting for the disclosure. The present disclosure may also be applicable to more or a lesser number of nodes, MP servers, and vehicles for event determination of the vehicles and the occupants of the mobility player system 102, without a deviation from the scope of the disclosure. For the sake of brevity, only N number of the nodes of the MaaS network 104, N number of servers of the plurality of MP servers 118, and N number of vehicles 120A-120N have been shown in FIG. 1. However, in some embodiments, there may be more than N number of the nodes of the MaaS network 104, the number of servers of the plurality of MP servers 118, and the vehicles 120A-120N, without limiting the scope of the disclosure. Further, one vehicle (such as the first vehicle 120A) associated with one mobility provider server (such as the first MP server 118A) shown in FIG. 1, is merely presented as an example. One mobility provider server may be associated multiple vehicle, without limiting the scope of the disclosure.

The mobility player system 102 may include suitable logic, circuitry, code, and/or interfaces that may be configured to perform operations for the event determination for the vehicles (such as, the first vehicle 120A, the second vehicle 120B, . . . and the Nth vehicle 120N) and occupants (such as, the occupant 122) of the mobility providers on the MaaS network 104. The mobility player system 102 may perform the operations by utilization of the communication network 126 (such as, a 5th generation (5G) communication network). The mobility player system 102 may be an artificial intelligence (AI) system that may include a trained AI model (for example, the trained AI model 204A of FIG. 2). The trained AI model may include at least one of one or more machine learning models or one or more trained neural network models. The trained AI model may be applied on a plurality of parameters for event determination for the vehicles 120A-120N. The details of the operations of the mobility player system 102 are provided, for example, in FIG. 4. The mobility player system 102 may be associated with or dedicated to one mobility provider (or one mobility provider server). Examples of the mobility player system 102 may include, but is not limited to, a mobility provider virtual machine, a mobility provider intelligent engine, a server, a computing device, a mainframe machine, a computer workstation, or an electronic device to handle large-scale data (i.e. trip data received from one or more mobility provider servers or vehicles).

The MaaS network 104 may support a standard specification for communication. The plurality of publisher nodes 106A-106N (i.e., ticket readers or taxi applications) of all mobility providers across the MaaS network 104 may follow a standard or common communication protocol for data exchange. The MaaS network 104 may include homogeneous publisher nodes that may follow the MaaS standard specification for communication. The MaaS network 104 may further include heterogeneous publisher nodes that may follow proprietary communication protocols. The MaaS network 104 may offer a plug-in based support to the publisher nodes so that such heterogeneous publisher nodes can be supported until the respective mobility providers adhere to and provide support for the MaaS standard specification for communication.

The MaaS network 104 may provide a plugin architecture for the publisher nodes associated with different transportation providers (i.e., mobility providers) to join the MaaS network 104. Through a node management device (not shown in FIG. 1), the MaaS network 104 may provide bulk cluster management of the publisher nodes. All the publisher nodes may follow set protocols to operate on the MaaS network 104. The set protocols may mandate a common security architecture (for publisher node authentication and authorization), a network protocol (e.g., HTTP, MQTT, AMQP, and the like), a uniform data request or response format (e.g., JSON, CSV, or XML format), and an API/data scheme. This may ensure that each publisher node follows a cluster-level configuration (such as a device profile including a company name, a company ID, a gate ID, a gate number, and the like) and a device-level certificate (i.e., the authentication credential). The pattern of cluster-level configuration and the set protocols may facilitate transportation providers (i.e., mobility providers) to deploy new publisher nodes or replace existing publisher nodes with a plug-and-play approach. This may facilitate the MaaS network 104 to function as a homogeneous transportation network with interoperability between resources (such as, publisher nodes) of the various transportation providers (i.e., mobility providers).

The plurality of publisher nodes 106A-106N may include suitable logic, circuitry, code, and/or interfaces that may be configured to operate as a ticket processing client for a mobility service (such as a transport service) of a respective mobility provider (such as, a transportation provider). For example, as a ticket processing client, the plurality of publisher nodes 106A-106N may read, issue, recharge, or cancel tickets to create events associated with the respective transport service. Based on such events, transaction messages may be communicated to one or more subscriber nodes (such as, the plurality of subscriber nodes 110A-110N) of the MaaS network 104 through the broker node device 108. Examples of the plurality of publisher nodes 106A-106N may include, but are not limited to, a consumer electronic device with a trip planning or booking application, a ticket reader on a ticketing gate, a ticketing kiosk a Point-of-Sale (PoS) device, a mobile POS, a ticket vending machine, a smart door of a transport vehicle which may read a ticket to start or end a ride.

The plurality of subscriber nodes 110A-110N may include suitable logic, circuitry, code, and/or interfaces that may be configured to receive the transaction messages, through the broker node device 108, from one or more of the plurality of publisher nodes 106A-106N. Each transaction message may include a topic which may be subscribed by one or more subscriber nodes of the plurality of subscriber nodes 110A-110N. Examples of implementation of a subscriber node may include, but are not limited to, a web server, an edge device, an edge node, a cloud server, a cluster of cloud-based servers, a workstation, or any computing device with a fog computing capability.

A first publisher node 106A of the plurality of publisher nodes 106A-106N and a first subscriber node 110A of the plurality of subscriber nodes 110A-110N may be associated with a first transportation provider. Other nodes, such as a second publisher node 106B and a second subscriber node 110B may be associated with the first transportation provider or a second transportation provider which may be different from the first transportation provider.

The broker node device 108 may include suitable logic, circuitry, code, and/or interfaces that may be configured to route transaction messages from a publisher node (such as the first publisher node 106A) to a subscriber node (such as the first subscriber node 110A). Decisions to authorize the broker node device 108 to route such transaction messages to the subscriber nodes may be determined by a server (not shown in FIG. 1) associated with the MaaS network 104. Example implementations of the broker node device 108 may include, but are not limited to, an application server, a cloud server, a mainframe server, a database server, a web server, or other type of servers.

The broker node device 108 may be configured to communicate with each of the plurality of publisher nodes 106A-106N and the plurality of subscriber nodes 110A-110N through a suitable publish-subscribe network protocol, such as, but not limited to, a Message Queuing Telemetry Transport (MQTT)-based messaging protocol, an Advanced Message Queuing Protocol (AMQP)-based messaging protocol, or a Message-Oriented Middleware (MOM)-based messaging framework.

The plurality of MP nodes 112A-112N may include suitable logic, circuitry, code, and/or interfaces that may be configured to store transaction data associated with a respective mobility provider. For example, a first MP node 112A may store transaction data (such as trip data) associated with a first mobility provider. The transaction data may include records of trips of users. Each trip may correspond to a mobility service that may be provided by the first mobility provider (for example, associated with the first MP server 118A) in at least one leg of the journey. Each of the plurality of MP nodes 112A-112N may be referred to as nodes of a distributed ledger 112 that may store transaction data of the various mobility providers of the MaaS network 104.

The plurality of MaaS nodes 114A-114N may include suitable logic, circuitry, code, and/or interfaces that may be configured to store transaction data associated with all mobility providers of the MaaS network 104. The storage of the transaction data associated with each of the mobility providers may be used to settle transactions of trips amongst the mobility providers that offer mobility services to users. Each of the plurality of MaaS nodes 114A-114N may correspond to nodes of a distributed ledger 114 that may store transaction data associated with the MaaS network 104.

Each of the plurality of the MP nodes 112A-112N and each of the plurality of MaaS nodes 114A-114N may be associated with the distributed ledger sub-nodes 116. For e.g., each of the first MP node 112A and the first MaaS node 114A may be associated with the driver sub-node 116A, the user sub-node 116B, and the document sub-node 116C of the distributed ledger sub-nodes 116. Further, each of the second MP node 112B, and the second MaaS node 114B may be associated with the driver sub-node 116A, the user sub-node 116B, and the document sub-node 116C of the distributed ledger sub-nodes 116. Similarly, each of the Nth MP node 112N, and the Nth MaaS node 114N may be associated with the driver sub-node 116A, the user sub-node 116B, and the document sub-node 116C of the distributed ledger sub-nodes 116. The driver sub-node 116A of the distributed ledger sub-nodes 116 may store driver profile information associated with mobility providers of the MaaS network 104. In an embodiment, the driver sub-node 116A may store an event timeline (or event tracking information) associated with a driver. Exemplary information that may be included in the event timeline associated with the driver may include, but is not limited to, a scorecard associated with the driver, a profile associated with the driver, behavior information associated with the driver, and an event context, such as, traffic information, an action of the driver, and a speech of the driver. The user sub-node 116B of the distributed ledger sub-nodes 116 may store user (or passenger) information associated with the mobility providers of the MaaS network 104. In an embodiment, the user sub-node 116B may store an event timeline (or event tracking information) associated with the user. Exemplary information that may be included in the event timeline associated with the user may include, but is not limited to, user-specific settings and preferences (such as, privacy settings). The user-specific settings and preferences may help the mobility providers and the MaaS provider to ensure that data privacy standards, legal obligations, and rules (such as, General Data Protection Regulation (GDPR)) may be complied with respect to a storage of user data in distributed ledger nodes/sub-nodes. The document sub-node 116C of the distributed ledger sub-nodes 116 may store log information including the OBD data associated with the vehicles 120A-120N of the mobility providers of the MaaS network 104. Moreover, the document sub-node 116C may store notification information and messages generated based on the determined one or events associated with the MaaS network 104.

In an embodiment, at least two ledger nodes of each of the distributed ledger 112, the distributed ledger 114 may store transaction data associated with a MaaS transportation service. The MaaS transportation service may be associated with one or more of: the plurality of transportation providers and/or a user (for example a passenger) who may avail the MaaS transportation service through a unified MaaS interface or through the plurality of publisher nodes 106A-106N. The transaction data associated with the MaaS transportation service may be included in a set of state objects, such as an initial state object and an updated version of the initial state object. Each state object may include a smart contract, a contract code (or rules of a transaction upon which parties to the transaction agree), and state properties (that may be updated when the transaction data is updated based on transaction requests (associated with transaction messages) from the plurality of publisher nodes 106A-106N).

In at least one embodiment, each of the distributed ledger 112 and the distributed ledger 114 may be decentralized and distributed database systems that may maintain an immutable record of data operations or transactions. A set of data operations may be grouped together as a block and may be further linked to a previous block of data operations to form a chain of a plurality of blocks. All blocks of data operations may be stored in a decentralized manner, whereby at least two participants or nodes of each of the distributed ledger 112 and the distributed ledger 114 may store a subset of the plurality of blocks associated with one or more transactions in which the at least two participants or nodes may participate. Further, each of the distributed ledger 112 and the distributed ledger 114 may include an operating system (for example, a Java Virtual Machine (JVM)) which may allow for deployment of a smart contract between multiple parties, for example, mobility provider node(s) of the first transportation provider) and a counter-party node (i.e. the MaaS provider node).

By way of example, and not limitation, each of the distributed ledger 112 and the distributed ledger 114 may be a distributed ledger technology (DLT) system, such as, blockchain based system (for example, a Corda blockchain, an Ethereum blockchain, or a Hyperledger blockchain). Each of the distributed ledger 112 and distributed ledger 114 may store a set of immutable state objects that may be tracked by the each of the distributed ledger 112 and the distributed ledger 114, respectively. The state object may include a set of distributed ledger compatible rules for different types of distributed ledger technologies. For example, the state object may include transaction data, such as, a smart contract between parties, contract code (rules of transaction), and content including state properties with certain state values. The smart contract may include a set of conditions under which multiple parties to the smart contract may agree to interact with each other. The smart contract may run on one or more nodes of each of the distributed ledger 112 and the distributed ledger 114 and may govern transitions between state objects to generate a transaction. The smart contract may be written once, reused for a large numbers of state objects, and may refer to a governing legal prose by way of cryptographic hashes.

Each of the distributed ledger 112 and the distributed ledger 114 may use secure cryptographic hashes to identify parties and data and also to link a state object to a previous version of the state object to provide chains of provenance. A transaction between a group of parties may be stored on each of the distributed ledger 112 and the distributed ledger 114 such that only the group of parties associated with the transaction may be able to view the transaction. A party associated with a transaction may store a current state object of the transaction in a vault (a database associated with the distributed ledger 112 or the distributed ledger 114). Another party eligible to view or process the transaction (e.g., validate the transaction) may retrieve the current state object of the transaction from the vault. Additionally, each state object of each of the distributed ledger 112 and the distributed ledger 114 may include a smart contract between the parties or nodes that may participate in an associated transaction.

On each of the distributed ledger 112 and the distributed ledger 114, a participant or a node (for example, the first MP node 112A or the first MaaS 114A) may update a transaction by updating state properties of an input state object (for example, the first state object) to produce an output state object (for example, the second state object). The updated transaction may thereby create a chain of provenance (which may be associated with the transaction data). Each of the distributed ledger 112 and the distributed ledger 114 may provide a consensus for the updated transaction based on a determination of a validity of the updated transaction and a determination of a uniqueness of the updated transaction. In an embodiment, the participants of nodes associated with the updated transaction may determine the validity of the updated transaction by an independent execution of smart contracts and validation logic associated with the transaction. Further, by using a consensus node associated with each of the distributed ledger 112 and the distributed ledger 114, the uniqueness of the updated transaction may be determined. For example, the consensus node may determine the uniqueness of the updated transaction based on a check that there exists no other transaction that has reached a consensus by use of the same input state object as the current transaction.

In accordance with an embodiment, each of the distributed ledger 112 and the distributed ledger 114 may be associated with a decentralized application that may include a client-side interface (a front-end) and a server-side interface (a back end). The decentralized application may be configured to implement a workflow (e.g., a Corda flow) associated with the blockchain to record a transaction on a node (such as, the first MP node 112A) of the distributed ledger 112 and/or a node (such as, the first MaaS node 114A) of the distributed ledger 114. The client-side interface may be hosted on each of the plurality of subscriber nodes 110A-110N and the client-side interface may be configured to load up on a client associated with a subscriber node. For example, the client-side interface of the decentralized application may be a Remote Procedure Call (RPC) client that may be configured on each subscriber node and the counter-party node (i.e. the MaaS provider node). The server-side interface of the decentralized application may run on each node of the distributed ledger 112 and each node of the distributed ledger 114, associated with a corresponding subscriber node and the counter-party node.

In an embodiment, the transaction request (associated with a transaction message) from a publisher node may initiate a MaaS transaction between a mobility provider node (such as, the first MP node 112A of the distributed ledger 112) and a MaaS provider node (i.e. the counter-party node). The distributed ledger 112 may store records for the MaaS transaction between two parties, i.e., the mobility provider node (e.g., the first MP node 112A of the first mobility provider) and the MaaS provider node (i.e. the counter-party node). In an embodiment, the distributed ledger 114 may also store records for the MaaS transaction between the first mobility provider and the MaaS provider node. The distributed ledger 114 may additionally store records of MaaS transactions between other mobility providers of the MaaS network 104 and the MaaS provider node.

In case of multiple MaaS providers, an exemplary implementation may include a plurality of MaaS provider nodes, each of which may be associated with a certain MaaS provider and may be included in a separate distributed ledger for the respective MaaS provider. In certain scenarios, the plurality of MaaS provider nodes may be included in a common distributed ledger, such as the distributed ledger 114.

In an embodiment, the first MP node 112A may be one of many database nodes of the distributed ledger 112 and the first MaaS node 114A may be one of any database nodes of the distributed ledger 114. Each of the first MP node 112A and the first MaaS node 114A may be configured to receive a transaction message via the first subscriber node 110A. Each of the first MP node 112A and the first MaaS node 114A may be configured to update an initial state object associated with each of the distributed ledger 112 and the distributed ledger 114 based on the transaction message to output an updated state object. Each of the first MP node 112A and first MaaS node 114A may build a transaction that may include the initial state object with initial transaction data and the updated state object with updated transaction data.

The plurality of MP servers 118 may include suitable logic, circuitry, code and/or interfaces that may be configured to perform management of trips or trip data associated with the respective mobility providers. For example, the first MP server 118A may be configured to manage the trips or related trip data associated with the first mobility provider. The second MP server 118B may be configured to manage the trips and related trip data associated with a second mobility provider. Similarly, the Nth MP server 118N may be configured to manage the trips and related trip data associated with an Nth mobility provider. Each of the plurality of MP servers 118 may be implemented as a cloud server and may execute operations through web applications, cloud applications, HTTP requests, repository operations, file transfer, and the like. Other example implementations of each of the plurality of MP servers 118 may include, but are not limited to, a database server, a file server, a web server, a media server, an application server, a mainframe server, or a cloud computing server. In at least one embodiment, each of the plurality of MP servers 118 may be implemented as a plurality of distributed cloud-based resources by use of several technologies that are well known to those ordinarily skilled in the art. In some embodiments, one or more of the plurality of MP servers 118 may be implemented within the respective vehicle, such as the first vehicle 120A, the second vehicle 120B, . . . and the Nth vehicle 120N.

Each of the first vehicle 120A, the second vehicle 120B, . . . and the Nth vehicle 120N may be a non-autonomous vehicle, a semi-autonomous vehicle, or a fully autonomous vehicle, for example, as defined by National Highway Traffic Safety Administration (NHTSA). Examples of the first vehicle 120A, the second vehicle 120B, . . . and the Nth vehicle 120N may include, but are not limited to, a two-wheeler vehicle, a three-wheeler vehicle, a four-wheeler vehicle, a hybrid vehicle, or a vehicle with autonomous drive capability that uses one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources. Examples of the two-wheeler vehicle may include, but are not limited to, an electric two-wheeler, an internal combustion engine (ICE)-based two-wheeler, or a hybrid two-wheeler. Similarly, examples of the four-wheeler vehicle may include, but are not limited to, an electric car, an internal combustion engine (ICE)-based car, a fuel-cell based car, a solar powered-car, or a hybrid car. It may be noted the description of other types of the vehicles has been omitted from the disclosure for the sake of brevity. Each of the first vehicle 120A, the second vehicle 120B, . . . and the Nth vehicle 120N may be a system through which a rider (such as the occupant 122) may travel from a start point to a destination point. Each vehicle may have one or more On-Board Diagnostic (OBD) ports to transfer the OBD data to an external device that may be connected to the one or more OBD ports. Further, each vehicle may have a plurality of sensors (such as image capturing devices, audio capturing devices) to determine occupant data associated with the corresponding vehicle. The occupant data may include information associated with one or more occupants (e.g., the occupant 122), such as, drivers and passengers of the vehicle.

The occupant 122 may be a driver of the first vehicle 120A. In another embodiment, the occupant 122 may refer to a passenger of the first vehicle 120A. The passenger may request for a first trip via the mobility player system 102. In some embodiments, the mobility player system 102 may receive the request, via the corresponding MP server (such as the first MP server 118A). The mobility player system 102 may further assign the first vehicle 120A for the requested trip to the passenger as the occupant 122 of the first vehicle 120A. Furthermore, in case the occupant 122 is the driver, the driver may receive the request for the trip from the mobility player system 102, via the first electronic device 124. The driver as the occupant 122 may further confirm an acceptance of the requested trip via the first electronic device 124. The mobility player system 102 may notify the passenger (via first electronic device 124) about the acceptance of the requested trip. It may be noted that one occupant (such as the occupant 122) shown in FIG. 1, is merely an example. There may be more than one occupant 122, as the passenger or the driver, associated with the first vehicle 120A, without limiting the scope of the disclosure.

The first electronic device 124 may include suitable logic, circuitry, and interfaces that may be configured to transmit and receive information from the mobility player system 102. The first electronic device 124 may be associated with the occupant 122, such as a driver or a passenger. Examples of the first electronic device 124 may include, but are not limited to, a computing device, a smartphone, a cellular phone, a mobile phone, a vehicle electronic dashboard, a vehicle infotainment system, a gaming device, a mainframe machine, a server, a computer work-station, and/or a consumer electronic (CE) device.

The communication network 126 may include a communication medium through which each node of the MaaS network 104 may communicate with the mobility player system 102, the plurality of MP servers 118, and the external server 128. Examples of the communication network 126 may include, but are not limited to, the Internet, a cloud network, a Wireless Fidelity (Wi-Fi) network, a Personal Area Network (PAN), a Local Area Network (LAN), or a Metropolitan Area Network (MAN). Various nodes of the MaaS network 104 may be configured to connect to the communication network 126, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols. In some embodiments, the communication network 126 may correspond to a fifth generation (5G) network.

The external server 128 may include suitable logic, circuitry, code and/or interfaces that may be configured to receive a first set of the OBD data and a first set of the occupant from the mobility player system 102. The external server 128 may further determine a first set of parameters based on the received first set of the OBD data and the first set of the occupant data. Details of the external server 128 are provided, for example, in FIG. 4. The external server 128 may be implemented as a cloud server and may execute operations through web applications, cloud applications, HTTP requests, repository operations, file transfer, and the like. Other example implementations of the external server 128 may include, but are not limited to, a database server, a file server, a web server, a media server, an application server, a mainframe server, or a cloud computing server.

In operation, the mobility player system 102 receives the OBD data associated with the first vehicle 120A. The first vehicle 120A may be registered with the first mobility provider. The OBD data may be received from an OBD port associated with the first vehicle 120A. In an embodiment, the mobility player system 102 may receive the OBD data related to the first vehicle 120A from the first MP server 118A associated with the first vehicle 120A. The OBD port may provide self-diagnostic data related to the first vehicle 120A. In an embodiment, the OBD port may be implemented via a standardized digital communication port to provide real-time OBD data to the mobility player system 102 or to different diagnostic/control devices coupled with the first vehicle 120A. Furthermore, the OBD port may be provide the OBD data in form of standardized series of diagnostic trouble codes (DTC). Examples of the OBD data may include, but are not limited to, engine load parameters, engine temperature data, RPM data, throttle position data, fuel and air metering data, fuel pressure data, vehicle brake data, acceleration data, timing data, ignition system statistics, misfire information, auxiliary emissions control data, speed control data, transmission control data, information related to service time and wear & tear associated with the first vehicle 120A. The first vehicle 120A may be associated with the first mobility provider. The first mobility provider may be associated with the first MP server 118A.

The mobility player system 102 may further receive the occupant data from the plurality of sensors associated with the first vehicle 120A. In an embodiment, the mobility player system 102 may receive the occupant data related to the first vehicle 120A from the first MP server 118A associated with the first vehicle 120A. The occupant data (related to the occupant 122) may be different from the OBD data. The occupant 122 may be the driver and the passenger of the first vehicle 120A. In accordance with an embodiment, the plurality of sensors may include, but are not limited to, one or more imaging sensors, depth sensors, Light Detection and Ranging (LiDAR) sensor and one or more audio sensors.

For example, the occupant data may include, but is not limited to, data received from the one or more imaging sensors or the depth sensors, such as, captured images and videos of the occupant 122 that may indicate for example, a sitting posture of the occupant 122 (such as both the driver and the passenger), position of seats of the vehicles, navigation data (such as, a distance between the first vehicle 120A and surrounding objects of the first vehicle 120A) received from the LiDAR sensor, voice data (associated with the occupant 122) received from the one or more audio sensors. The details of the reception of the OBD data and the occupant data are further provided, for example, in FIG. 4. In accordance with an embodiment, the mobility player system 102 may further be configured to receive external data from a server. The external data may include information about road conditions, information about weather conditions, traffic update on a route of travel, or a route map of the route of travel of the first vehicle 120A.

The mobility player system 102 may further be configured to determine the plurality of parameters for event determination (or prediction) for the first vehicle 120A, based on the received OBD data, the received occupant data, and the external data. In accordance with an embodiment, the plurality of parameters may include, but are not limited to, acceleration and deacceleration information of the first vehicle 120A, a speed of the first vehicle 120A, a closeness of the first vehicle 120A with respect to surrounding objects, honking from the first vehicle 120A, an intensity of brakes applied by a driver as the occupant 122 of the first vehicle 120A, a health status of the first vehicle 120A, a usage of seat belt by the occupant 122 of the first vehicle 120A, an efficiency of the driver, an overcapacity of occupants in the first vehicle 120A, an adherence to traffic rules by the occupant 122 of the first vehicle 120A, an amount of spent time on phone by the occupant 122, a volume of verbal communication of occupants in the first vehicle 120A, an intensity of volume of music in the first vehicle 120A, road conditions related to route of the first vehicle 120A, weather conditions related to the route of the first vehicle 120A, information about lane switching for the first vehicle 120A, weaving information, or swerving information about the first vehicle 120A. The details of the determination of the plurality of parameters are further provided, for example, in FIG. 4.

The mobility player system 102 may be the AI system including the trained AI model that may include at least one of the one or more trained machine learning models and the one or more trained neural network model. The mobility player system 102 may be configured to apply the trained AI model (e.g., the one or more trained machine learning models and the neural network models) on the determined plurality of parameters. For example, the AI system may be trained on one or more machine learning models, such as, but not limited to Support Vector Machine (SVM) algorithm, a K-nearest neighbors (KNN) algorithm, or a random forest algorithm. Similarly, the AI System may be trained on one or more neural network models, such as, but not limited to a deep neural network (DNN), a convolutional neural network (CNN), a recurrent neural network (RNN), a CNN-recurrent neural network (CNN-RNN), R-CNN, Fast R-CNN, Faster R-CNN, and an artificial neural network (ANN). The details of the application of the one or more trained machine learning models and/or the one or more trained neural network models are further provided, for example, in FIG. 4.

The mobility player system 102 may further determine one or more events related to the first vehicle 120A, or related to the occupant 122 of the first vehicle 120A, based on the application of the one or more trained machine learning model and/or the one or more trained neural network models on the determined plurality of parameters. In accordance with an embodiment, the determined one or more events may include an aggression in behavior of a driver as the occupant 122 of the first vehicle 120A, an adherence to safe driving practices by the driver of the first vehicle 120A, an adherence to regulatory policies by the driver of the first vehicle 120A, a comfort level provided to a passenger as the occupant 122 of the first vehicle 120A, a hazardous driving conditions, or a rash driving pattern of the driver as the occupant 122 of the first vehicle 120A. The details of the determination of the one or more events are further provided, for example, in FIG. 4.

The mobility player system 102 may further transmit information about the determined one or more events to one or more nodes of a distributed ledger associated with the MaaS network 104. In an example, the information about the determined one or more events may be stored on the distributed ledger sub-nodes 116 associated with one or more MP nodes and/or one or more MaaS nodes of the MaaS network 104. For example, information of the one or more events associated with the driver (e.g., driver profile information) may be stored on the driver sub-node 116A of the first MP node 112A Further, information of the one or more events associated with the passenger (e.g., passenger profile information) may be stored on the user sub-node 116B of the first MP node 112A.

Based on the determination of the events related to the first vehicle 120A, or related to the occupant 122, the mobility player system 102 may allow prevention of accidents or instances, such as vehicle breakdown, hazardous driving conditions, rash driving by the driver, passenger dissatisfaction, disputes, regulatory violations, and so forth. The mobility player system 102 may thus, allow safe operations of the first vehicle 120A as well as provide safety to the occupants of the first vehicle 120A.

The mobility player system 102 may further store the driver profile information and the passenger profile information on a distributed ledger (e.g., the driver sub-node 116A and the user sub-node 116B associated with the first MP node 112A), and thus may ensure information security and provide privacy to the passengers (such as customers). The mobility player system 102 may further enable effective handling of disputes that may occur between the passengers, the drivers, or the mobility providers, by utilizing information (i.e. about event and profiles) stored on the distributed ledger (e.g., the driver sub-node 116A and the user sub-node 116B associated with the first MP node 112A). Moreover, the mobility player system 102 may enable the plurality of mobility providers to utilize authorized information (such as the driver profile information and/or the passenger profile information) to devise different service models that may provide monetary benefits to the plurality of mobility providers. Thus, the mobility player system of the present disclosure may ensure efficient, secure, and profitable fleet operations associated with the plurality of mobility providers.

Figure 2:
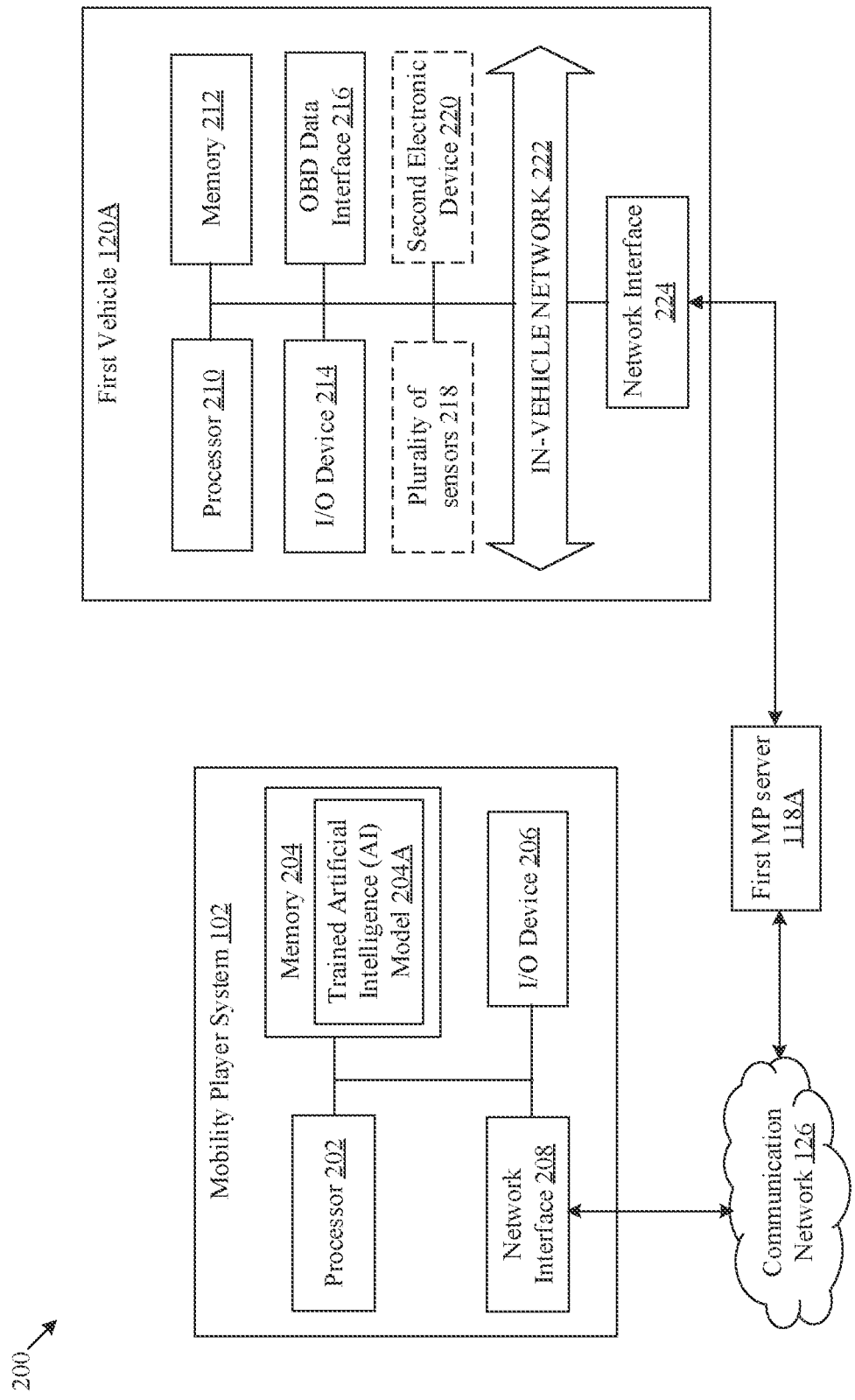
FIG. 2 is a block diagram of a mobility player system and a first vehicle for event determination for vehicles and occupants of mobility providers on a MaaS platform, in accordance with an embodiment of the disclosure.

FIG. 2 is a block diagram of a mobility player system and a first vehicle for event determination for vehicles and occupants of mobility providers on a MaaS platform, in accordance with an embodiment of the disclosure. FIG. 2 is explained in conjunction with elements from FIG. 1. With reference to FIG. 2, there is shown a block diagram 200. The block diagram 200 may include the mobility player system 102 and a vehicle (such as the first vehicle 120A). The mobility player system 102 may be communicatively coupled to the first vehicle 120A via the first MP server 118A.

The mobility player system 102 may include a processor 202, a memory 204. The memory 204 may include a trained AI model 204A (which may include both the one or more trained machine learning models and the one or more trained neural network models). The mobility player system 102 may further include an input/output (I/O) device 206, and a network interface 208. The first vehicle 120A may include a processor 210, a memory 212, an I/O device 214, an OBD data interface 216 and a plurality of sensors 218. The first vehicle 120A may further include a second electronic device 220, an in-vehicle network 222, and a network interface 224.

The processor 202 of the mobility player system 102 may include suitable logic, circuitry, and interfaces that may be configured to execute a set of instructions stored in the memory 204. The processor 202 may be configured to execute program instructions associated with different operations to be executed by the mobility player system 102. For example, some of the operations may include determination the plurality of parameters based on the received OBD data and the received occupant data. The operations may further include determination of the one or more events related to the first vehicle 120A or related to the occupant 122 of the first vehicle 120A, based on the application of the trained AI model 204A on the determined plurality of parameters. The processor 202 may be implemented based on a number of processor technologies known in the art. Examples of the processor technologies may include, but are not limited to, a Central Processing Unit (CPU), an X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), and other processors.

The memory 204 of the mobility player system 102 may include suitable logic, circuitry, and interfaces that may be configured to store the one or more instructions to be executed by the processor 202. The memory 204 may be configured to store the received OBD data, the occupant data, plurality of parameters, and the determined one or more events. The memory 204 may be further configured to store the trained AI model 204A (that include the one or more trained machine learning models and the one or more trained neural network models). Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The trained AI Model 204A (that may include the one or more trained machine learning models and the one or more trained neural network models) may be a classifier/regression/clustering model which may be trained to identify a relationship between inputs, (such as features in a training dataset that may include a dataset of the plurality of parameters) and output labels that may include a dataset of classified events associated with the dataset of the plurality of parameters. The trained AI model 204A may be defined by its hyper-parameters, for example, number of weights, cost function, input size, number of layers, and the like. The hyper-parameters of the trained AI model 204A may be tuned and weights may be updated so as to move towards a global minima of a cost function for the trained AI model 204A. After several epochs of the training on the feature information in the training dataset, the neural network model may be trained to generate the trained AI model 204A and subsequently output a prediction/classification result for a set of inputs. The prediction result may be indicative of a class label for each input of the set of inputs (e.g., input features extracted from new/unseen instances). For example, the prediction result may indicate a recommended route, a recommended vehicle, and/or a recommended driver, for a trip of a user. The broker node device 108 may select an appropriate route, vehicle, and/or driver for the trip of the user based on the prediction result from the trained AI model 204A of the mobility player system 102. Alternatively, or in addition, a ticket reader (e.g., a publisher node, such as, the first publisher node 106A) may display the prediction result to the user and enable the user to choose the route, vehicle, or driver for the trip of the user, based on the prediction result.

The trained AI model 204A may include electronic data, such as, for example, a software program, code of the software program, libraries, applications, scripts, or other logic or instructions for execution by a processing device, such as the processor 202. The trained AI model 204A may include code and routines configured to enable a computing device, such as the processor 202 to perform one or more operations for classification of one or more inputs (for example the plurality of parameters) into the one or more events. Additionally or alternatively, the trained AI model 204A may be implemented using hardware including a processor, a microprocessor (e.g., to perform or control performance of one or more operations), a field-programmable gate array (FPGA), or an application-specific integrated circuit (ASIC). Alternatively, in some embodiments, the trained AI model 204A may be implemented using a combination of hardware and software.

Examples of the AI Model 204A (such as the trained one or more neural network models) may include, but are not limited to, a deep neural network (DNN), a convolutional neural network (CNN), a recurrent neural network (RNN), a CNN-recurrent neural network (CNN-RNN), R-CNN, Fast R-CNN, Faster R-CNN, an artificial neural network (ANN), (You Only Look Once) YOLO network, a Long Short Term Memory (LSTM) network based RNN, CNN+ANN, LSTM+ANN, a gated recurrent unit (GRU)-based RNN, a fully connected neural network, a Connectionist Temporal Classification (CTC) based RNN, a deep Bayesian neural network, a Generative Adversarial Network (GAN), and/or a combination of such networks. In some embodiments, the trained AI model 204A may include numerical computation techniques using data flow graphs. In certain embodiments, the trained AI model 204A may be based on a hybrid architecture of multiple Deep Neural Networks (DNNs). Examples of the AI Model 204A (such as the trained one or more machine learning models) may further include but are not limited to, a linear regression model, a logistic regression model, a decision tree model, a K-means based model and a random forest model.

The I/O device 206 of the mobility player system 102 may include suitable logic, circuitry, and interfaces that may be configured to receive an input from a user and provide an output based on the received input. The I/O device 206 which may include various input and output devices, may be configured to communicate with the processor 202. Examples of the I/O device 206 may include, but are not limited to, a touch screen, a keyboard, a mouse, a joystick, a microphone, a display device, and a speaker.

The network interface 208 of the mobility player system 102 may include suitable logic, circuitry, and interfaces that may be configured to facilitate communication between the processor 202 and the first MP server 118A, via the communication network 126. The network interface 208 may be implemented by use of various known technologies to support wired or wireless communication of the mobility player system 102 with the communication network 126. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 208 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), a 5th generation network such as 5G new radio (NR) network, a 5G smart antenna, time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS). This network interface 208 may be capable to communicate with a 5G communication network and will include appropriate 5G support functionality such as, but not limited to, a 5G NR, a V2X Infrastructure, and a 5G Smart Antenna.

The processor 210 of the first vehicle 120A may include suitable logic, circuitry, and interfaces that may be configured to execute a set of instructions stored in the memory 212. The processor 210 may be configured to execute program instructions associated with different operations to be executed by the first vehicle 120A. For example, some of the operations may include generation or reception of the OBD data from the OBD data interface 216 in the first vehicle 120A. The processor 210 may be implemented based on a number of processor technologies known in the art. Examples of the processor technologies may include, but are not limited to, a CPU, an X86-based processor, a RISC processor, an ASIC processor, a CISC processor, a GPU, and other processors.

The memory 212 of the first vehicle 120A may include suitable logic, circuitry, and interfaces that may be configured to store the one or more instructions to be executed by the processor 210. The memory 212 may be configured to store the OBD data and the occupant data. The memory 212 may be further configured to store notification information (i.e. information about the one or more events) received from the mobility player system 102. Examples of implementation of the memory 212 may include, but are not limited to, a RAM, a ROM, an EEPROM, an HDD, a SSD, a CPU cache, and/or a SD card.

The I/O device 214 of the first vehicle 120A may include suitable logic, circuitry, and interfaces that may be configured to receive an input from a user, such as the occupant 122 and provide an output based on the received input. Examples of the output may include, but is not limited to, the notification information. The I/O device 214 which may include various input and output devices, may be configured to communicate with the processor 210. Examples of the I/O device 214 may include, but are not limited to, a vehicle dashboard, a touch screen, a keyboard, a mouse, a joystick, a microphone, a display device, and a speaker. In an example, the display device (such as, a touchscreen display device in the vehicle dashboard) may display the output, such as, the notification information.

The OBD data interface 216 may include suitable logic, circuitry, and/or interfaces that may be configured to control tracking, diagnostics, and communication of the OBD data between the first vehicle 120A and the mobility player system 102. The OBD data interface 216 may further handle vehicle health reporting service, installation of software updates/patches, and/or access to phone/internet network. The processor 210 may be configured to collect the OBD data of the first vehicle 120A from the OBD data interface 216. The OBD data interface 216 may further include one or more processing units, for example, a microcontroller, a microprocessor, a field programmable gate array (FPGA), and the like to perform the different operations related to data gathering, diagnosis and communication. In an embodiment, the entire functionality of the OBD data interface 216 may be incorporated at least partially or in its entirety in the processor 210 of the first vehicle 120A, without deviation from the scope of the present disclosure.

The plurality of sensors 218 of the first vehicle 120A may include suitable logic, circuitry, and/or interfaces that may be configured to generate the occupant data associated with the occupant 122 and/or the first vehicle 120A. The plurality of sensors 218 may further include a set of sensors to generate the OBD data associated with the first vehicle 120A. Examples of the plurality of sensors 218 may include, but are not limited to, RPM sensor, temperature sensor, pressure sensor, a fuel sensor, or a geo-location sensor. In addition, the plurality of sensors 218 may include the imaging sensor (such as camera), the LiDAR sensor, the audio sensor, mass airflow sensor, an engine speed sensor, an oxygen sensor, a spark knock sensor, a coolant sensor, a manifold absolute pressure (MAF) Sensor, a fuel temperature sensor, a voltage sensor, and a throttle position sensor.

The second electronic device 220 may include suitable logic, circuitry, and interfaces that may be configured to receive information, such as the notification information from the mobility player system 102. The second electronic device 220 may be further configured to receive regulatory information from a regulatory authority server. Examples of the second electronic device 220 may include, but are not limited to, a vehicle control system, an in-vehicle infotainment (IVI) system, an in-car entertainment (ICE) system, an automotive Head-up Display (HUD), an automotive electronic dashboard, a vehicle music system, a human-machine interface (HMI), a computing device, a smartphone, a cellular phone, a mobile phone, a gaming device, a mainframe machine, a server, a computer work-station, and/or a consumer electronic (CE) device. Although in FIG. 2, the second electronic device 220 is shown integrated in the first vehicle 120A, the disclosure is not so limited. Accordingly, in some embodiments, the second electronic device 220 may be separate from the first vehicle 120A, without deviation from scope of the disclosure. In some embodiments, the processor 210 may be integrated in the second electronic device 220.

The in-vehicle network 222 may include suitable logic, circuitry, and/or interfaces that may be configured to facilitate communication between internal components (such as the OBD data interface 302, the plurality of sensors 218, and the second electronic device 220) of the first vehicle 120A. A person of ordinary skilled in the art will understand that the first vehicle 120A may also include other suitable components or systems, in addition to the components or systems illustrated herein to describe and explain the function and operation of the present disclosure. A description of such components or systems is omitted herein for the sake of brevity.

The network interface 224 of the first vehicle 120A may include suitable logic, circuitry, and interfaces that may be configured to facilitate communication between the first vehicle 120A, the first MP server 118A, the mobility player system 102. The network interface 224 may be implemented by use of various known technologies to support wired or wireless communication of the first vehicle 120A via a communication network (such as the communication network 126). In some embodiments, the network interface 224 may support communication with the 5G network and may have appropriate 5G support functionalities to collect sensor data. The examples of the network interface 224 may be the same as the examples of the network interface 208 described, for example, in FIG. 2. Therefore, further examples of the network interface 224 are omitted from the disclosure for the sake of brevity.

Figure 3:
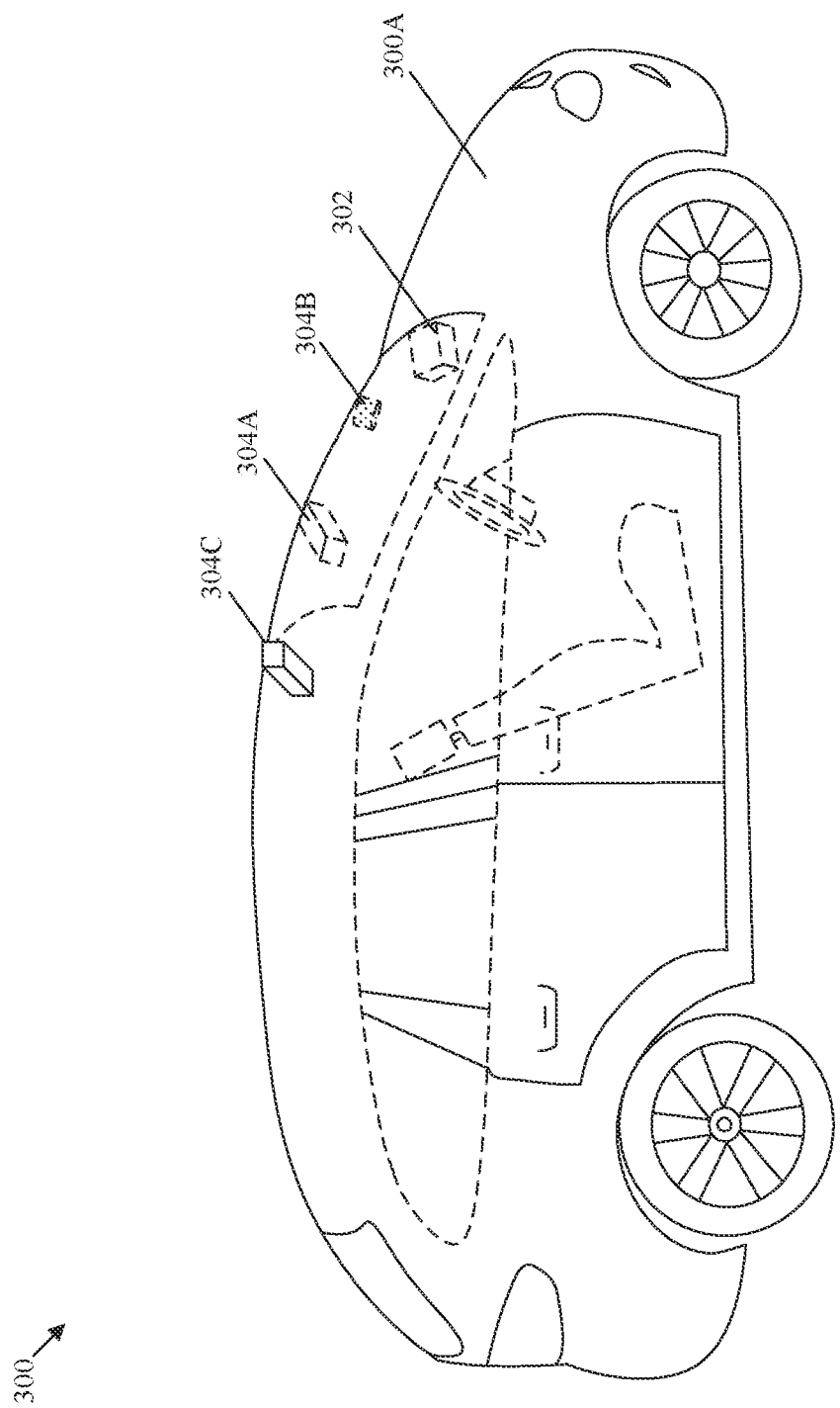
FIG. 3 is an exemplary scenario of a first vehicle, in accordance with an embodiment of the disclosure.

FIG. 3 is an exemplary scenario of a first vehicle, in accordance with an embodiment of the disclosure. FIG. 3 is described in conjunction with elements from FIGS. 1 and 2. With reference to FIG. 3, there is shown an exemplary scenario 300 of a first vehicle 300A. The functions of the first vehicle 300A may be same as the functions of the first vehicle 120A described, for example, in FIG. 2. Therefore, the description of the first vehicle 300A is omitted from the disclosure for the sake of brevity.

The first vehicle 300A may include an OBD data interface 302, and a plurality of sensors, such as an imaging sensor 304A, an audio sensor 304B and a LIDAR sensor 304C. The processor 210 of the first vehicle 300A may be configured to receive the OBD data, via the OBD data interface 302. The OBD data interface 302 may include for example, an on-board diagnostic II (OBD-II) port, an International Standards Organization (ISO) 27145 standardized on-board diagnostic port, or a World-Wide Harmonized On-Board Diagnostics (WWH-OBD) port. In an embodiment, the OBD data may be compatible with one or more of an OBD-II standard, an ISO 27145 standard, or a WWH-OBD standard. For example, the OBD data may be in a raw data format. The OBD data interface 302 may be located at a dashboard of the first vehicle 300A or at different internal surface of the first vehicle 300A.

The functions of the OBD data interface 302 may be same as the functions of the OBD data interface 216 described, for example, in FIG. 2. Therefore, the description of the OBD data interface 302 is omitted from the disclosure for the sake of brevity.

The OBD data may be utilized by the mobility player system 102 to determine one or more parameters of the plurality of parameters. The mobility player system 102 may be configured to receive the OBD data from the first vehicle 300A or the first MP server 118A associated with the first vehicle 120A (or the first vehicle 300A). For example, the plurality of parameters determined based on the OBD data may be, but not limited to, the acceleration and deacceleration information of the first vehicle 300A, sudden braking, intimidation level from other users, such as other drivers and pedestrians on a road, adherence to traffic rules by the driver as the occupant 122 of the first vehicle 300A, fast U-turns taken by the first vehicle 300A, weaving and swerving related to the first vehicle 300A, turning the first vehicle 300A with a wide radius, and so forth. The details of the utilization of the OBD data to determine the plurality of parameters are described, for example, in FIG. 4.

In an exemplary embodiment, the plurality of sensors may be installed inside or outside the first vehicle 300A. The imaging sensor 304A of the plurality of sensors may be located for example, at a corner or center of a windshield of the first vehicle 300A (or at different interior position of the first vehicle 300A) such that the driver and the passenger as the occupant 122 may lie within the filed-of-view (FOV) of the imaging sensor 304A. In an exemplary embodiment, the mobility player system 102 may request for a permission (for example consent) from the passenger as the occupant 122 to capture one or more images associated with the passenger. The mobility player system 102 may receive the occupant data from the imaging sensor 304A upon receiving the permission from the passenger. The occupant data received from the imaging sensor 304A may be utilized by the mobility player system 102 to determine one or more parameters of the plurality of parameters, such as the usage of seat belt by the occupant 122 of the first vehicle 300A, the overcapacity of occupants in the first vehicle 300A, drunken occupant in the first vehicle 300A, adherence to traffic regulations (like traffic lights).

The audio sensor 304B may be, for example, a microphone that may be configured to receive an audio input associated with the passenger and the driver as the occupant 122 of the first vehicle 300A. In an embodiment, the mobility player system 102 may request for a permission (for example, consent) from the passenger as the occupant 122 to capture the audio input associated with the passenger as the occupant 122 of the first vehicle 300A. The mobility player system 102 may receive the audio input associated with the passenger, upon receiving the permission from the passenger. The mobility player system 102 may receive the occupant data from the audio sensor 304B upon receiving the permission from the passenger. The occupant data received from the audio sensor 304B may be utilized by the mobility player system 102 to determine one or more parameters of the plurality of parameters, such as honking level of the first vehicle 300A, the amount of spent time on phone by the occupant 122, the volume of verbal communication of occupants in the first vehicle 300A, volume level of music played in the first vehicle 300A.

In accordance with an embodiment, the LIDAR sensor 304C may be located at an exterior top portion (or at different outer surface) of the first vehicle 300A, such as to measure distances between the first vehicle 300A and the surrounding objects (such as other vehicles, pedestrians, footpaths, or buildings). In one or more embodiments, the LIDAR sensor 304C may be located inside the first vehicle 300A, such as at an interior top portion of the first vehicle 300A. In some embodiments, the LIDAR sensor 304C may capture three-dimension (3D) maps of the objects in the surrounding of the first vehicle 300A. The occupant data received from the LIDAR sensor 304C may be utilized by the mobility player system 102 to determine one or more parameters of the plurality of parameters, such as the closeness of the first vehicle 300A with respect to surrounding objects, and overtaking distance by the driver as the occupant 122 of the first vehicle 300A. Moreover, the LIDAR sensor 304C may be utilized to capture the occupant data in low light conditions. Thus, the LIDAR sensor 304C may also be used to collect information associated with actions of the occupant 122 in the first vehicle 300A. The details of the utilization of the occupant 122 to determine the plurality of parameters are described, for example, in FIG. 4. In some embodiments, the processor 210 of the first vehicle 300A may capture the occupant data from the plurality of sensors 218 (such as the imaging sensor 304A, the audio sensor 304B, and/or the LIDAR sensor 304C) and transmit the captured occupant data to the first MP server 118A or to the mobility player system 102.

It may be noted here that the position/orientation/arrangement/shape/layout of the OBD data interface 302, the imaging sensor 304A, the audio sensor 304B and the LIDAR sensor 304C shown in FIG. 3 is presented merely as an example. The present disclosure may be also applicable to other position/orientations/arrangements/shape/layout of the OBD data interface and the plurality of sensors, without deviation from the scope of the disclosure. Further, the scope of the disclosure may not be limited to the use of the OBD data interface 302, the imaging sensor 304A, the audio sensor 304B, and the LIDAR sensor 304C for the collection of the OBD data. The first vehicle 300A may be associated with one or more other ports or sensors (not shown in FIG. 3), which may be located inside or outside the first vehicle 300A and may collect the OBD data.

Figure 4:
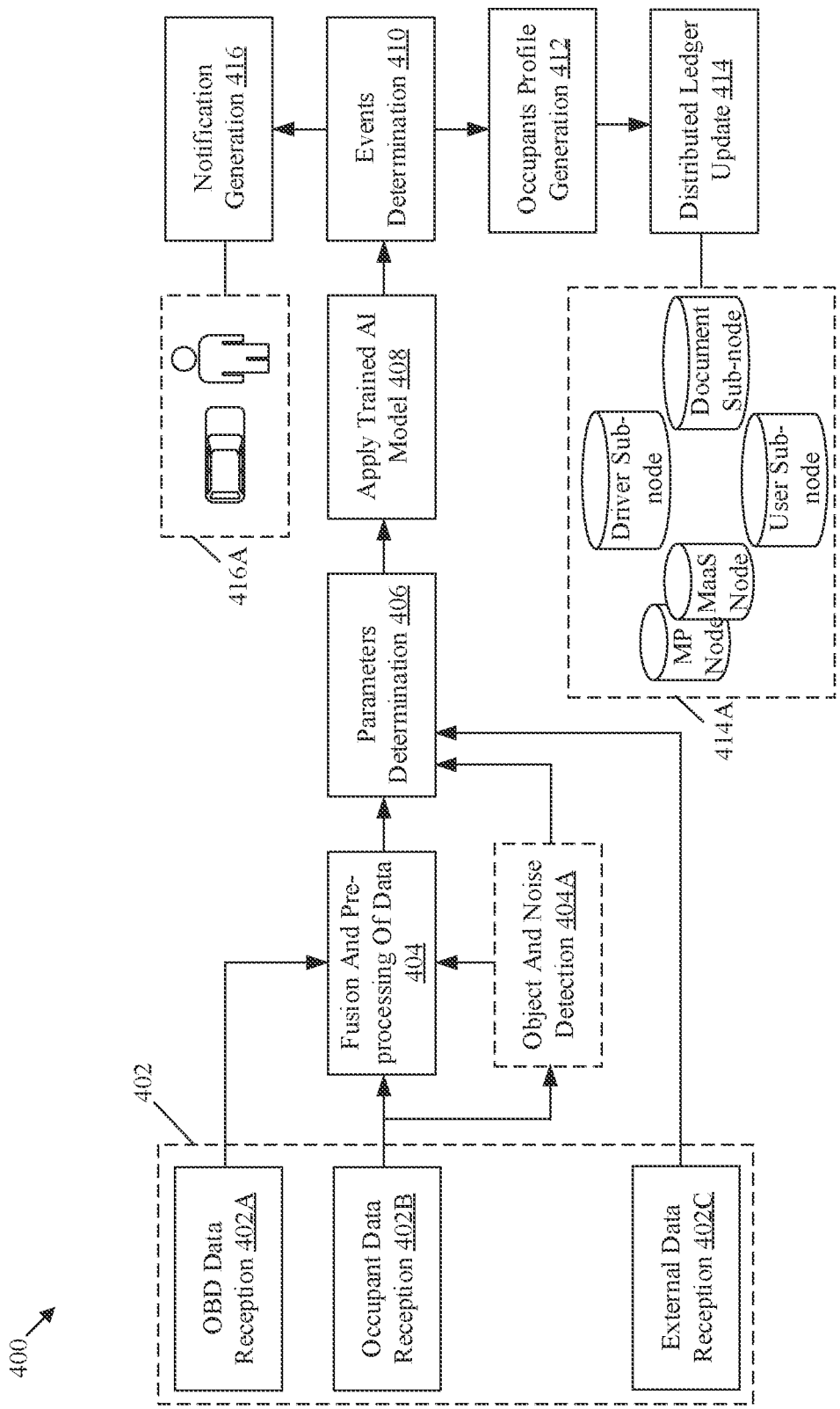
FIG. 4 is a sequence diagram that illustrates exemplary operations for event determination for vehicles and occupants of mobility providers on a MaaS platform, in accordance with an embodiment of the disclosure.

FIG. 4 is a sequence diagram that illustrates exemplary operations for event determination for vehicles and occupants of mobility providers on a MaaS platform, in accordance with an embodiment of the disclosure. FIG. 4 is described in conjunction with elements from FIGS. 1, 2 and 3. With reference to FIG. 4, there is shown a sequence diagram 400 to depict exemplary operations from 402 to 416. The exemplary operations illustrated in the sequence diagram 400 may start at 402 and may be performed by any computing system, apparatus, or device, such as by the processor 202 of the mobility player system 102 of FIG. 2.

At 402A, the OBD data associated with the first vehicle 120A may be received. In accordance with an embodiment, the processor 202 of the mobility player system 102 may be configured to receive the OBD data associated with the first vehicle 120A. The OBD data may be received from the OBD data interface 216 of the first vehicle 120A, via the communication network 126. In real-time, the mobility player system 102 may receive the OBD data from multiple vehicles either related to same mobility player or different mobility players. In some embodiments, the OBD data may be received from the first MP server 118A, associated with the first vehicle 120A. The mobility player system 102 may receive the OBD data from the plurality of MP servers 118 associated with large number of vehicles.

At 402B, the occupant data associated with the first vehicle 120A may be received. In accordance with an embodiment, the processor 202 of the mobility player system 102 may be configured to receive the occupant data associated with the first vehicle 120A. The occupant data may be received from the plurality of sensors 218 (i.e. imaging sensor 304A, audio sensor 304B, LIDAR sensor 304C) of the first vehicle 120A via the communication network 126. The occupant data may be different from the OBD data. In real-time, the mobility player system 102 may receive the occupant data from the plurality of sensors 218 associated with multiple vehicles which may be related to same mobility player or with different mobility players. In some embodiments, the occupant data may be received from the first MP server 118A, associated with the first vehicle 120A. The mobility player system 102 may also receive the occupant data from the plurality of MP servers 118 associated with large number of vehicles.

At 402C, external data may be received from a server (not shown). In accordance with an embodiment, the processor 202 of the mobility player system 102 may be configured to receive the external data from the server. The external data may be received by the processor 202 via the communication network 126. In some embodiments, the server may be a Global Navigation Satellite System (GNSS) server, such as a Global Positioning System (GPS) server, a Global Navigation Satellite System (GLONASS) server, a BeiDou Navigation Satellite System (BDS) server. In one or more embodiments, the server may be a weather satellite server, such as a Polar Operational Environmental Satellites (POES) server, a Geostationary Operational Environmental Satellites (GOES) server, and a 5G server. In some embodiments, the server may be a traffic server or a vehicle regulatory server.

In accordance with an embodiment, the external data received from the server may include, but is not limited to, information about road conditions, information about weather conditions, traffic update on a route of travel, regulatory traffic/driving policies, or a route map of the route of travel of the first vehicle 120A. The information about the weather conditions may include rainfall information, information about fog in the route, and so forth. In some embodiments, the weather conditions may be detected by the imaging sensor 304A or other plurality of sensors (such as humidity sensor, rainfall sensor in the first vehicle 120A). The information about road conditions may include information such as a level of wetness or moisture on the road due to rain, potholes on the road, a road blockage due to maintenance of the road, and so forth. In some embodiments, the road conditions may be detected by the imaging sensor 304A or the LIDAR sensor 304C. The traffic update on a route of travel may include information about amount of traffic congestion on the route of travel, information about a most efficient route of travel, live traffic updates on the route of travel and so forth. The regulatory traffic/driving policies may indicate information, such as a speed limit on a particular road, drunken driving policy, a number of occupants allowed in a vehicle, and so forth.

In accordance with an embodiment, the OBD data, the occupant data, and the external data may be received via a 5G communication network (such as the communication network 126). Advantageously, the 5G communication network may include a network slicing feature that may provide end-to-end customization capabilities in order to support diverse requirements for applications, such as large data management on MaaS network 104 associated with the plurality of mobility providers.

In an embodiment, mobility driven network slicing of the 5G communication network may support multiple network slices with different mobility management schemes. The mobility management schemes may be determined by an actual required levels of mobility support from the 5G communication network. The mobility management schemes may be obtained by orchestrating selected mobility management elementary functions.

In accordance with an embodiment, the processor 202 of the mobility player system 102 may be further configured to transmit a service requirement comprising a Quality of Service (QoS) requirement and a set of mobility network management functions to a virtual network operator (VNO) on the 5G communication network. The QoS requirement may include, for example, a 100 Megabits per Second (Mbps) bandwidth (i.e. due to large volume of the OBD data and the occupant data reception in real-time), a 10 milliseconds maximum latency, 1 millisecond maximum jitter and/or less than 1 seconds of recovery time. The set of mobility network management functions performed by the 5G communication network may include, but is not limited to, mobility context management, location tracking, paging, reachability management, handover control, mobility anchoring and path optimization. In some embodiments, the 5G communication network may be beneficial when real-time OBD data is received from the first vehicle 120A that may require fast speed transfer of the OBD data to the mobility player system 102.

In an embodiment, the VNO may receive the transmitted service requirement from the mobility player system 102. The VNO of the 5G communication network may further transmit, based on the received service requirement, a network resource request to an infrastructure provider associated with the 5G communication network. The VNO may perform analytics on the received service requirement and transmit the network resource request to the infrastructure provider. For example, the network resource may be utilized for the transmission of the OBD data and the occupant data to the mobility player system 102 on real-time basis from the plurality of MP servers 118 or multiple vehicles associated with the plurality of MP servers 118.

In accordance with an embodiment, the infrastructure provider may create a virtual network to allocate network resources of the 5G communication network in accordance with the service requirement and the received network resource request. The infrastructure provider may allocate a new resource for the service requirement or may adjust an existing resource for the service requirement. Thus, the created virtual network may cater to the needs of resource allocation for the transmission of at least one of the OBD data, the occupant data and the external data via the 5G communication network. Details related to the 5G communication network are described, for example, in FIG. 6

At 404, the received OBD data, the occupant data and the external data may be pre-processed. In an embodiment, the received OBD data, the occupant data and/or the external data may be in raw format (i.e. data directly captured from the OBD data interface 216 or from the plurality of sensors 218). In accordance with an embodiment, the processor 202 of the mobility player system 102 may be configured to fuse (for example combine) and pre-process the OBD data, the occupant data, and the external data. The pre-processing of the OBD data, the occupant data and the external data may include data cleaning, data editing, data reduction, and data wrangling. The data cleaning may include detection and removal of corrupt and incorrect information from the OBD data, the occupant data, and the external data. For example, blurred images captured by the imaging sensor 304A may be removed. The data editing may include review and adjustment of the received OBD data, the occupant data, and the external data to manage a quality of the received data. The data reduction may include, for example, scaling, encoding, sorting, and collating of the OBD data, the occupant data and the external data to form, for example, tabular data. Moreover, the data wrangling may include transformation of the raw data format into data of another format for analysis. In some embodiments, the data may be augmented in order to create a larger dataset for the trained AI model 204A. For example, in case of the captured images, the data set of the captured images may be augmented by addition of images produced by rotation, flipping, zooming-in and/or zooming-out of the captured images. In some embodiments, the processor 202 may pre-process or augment the raw data (i.e. OBD data or occupant data) with derivatives (for example data processing functions) to extract valuable or understandable insights from the received raw-data. For example, based on raw distance data, speed information may be extracted. The pre-processed or augmented data may be derived data from the received raw data.

At 404A, objects and noise may be detected from the received OBD data, and the occupant data. In accordance with an embodiment, the processor 202 of the mobility player system 102 may be configured to detect the objects and/or noise in the received OBD data and the occupant data, respectively. For example, objects may be detected from the images captured by the imaging sensor 304A or the LIDAR sensor 304C in the first vehicle 120A. In an example, the detected objects may include occupants in the first vehicle 120A (such as, the passengers and the driver) and objects on the route of travel (such as, other vehicles, pedestrians, infrastructure, and obstacles, such as, rocks). In another example, noise may be detected and filtered from audio captured by the audio sensor 304B in the first vehicle 120A. The detected noise may include ambient noise in the captured audio from the occupants in the first vehicle 120A, or from music played by the driver or the passengers, or form a honking sound of the first vehicle 120A. The detected noise may further include the noise associated with the surroundings of the first vehicle 120A, such as, a honking sound by other vehicles.

At 406, the plurality of parameters may be determined. In accordance with an embodiment, the processor 202 may be configured to determine the plurality of parameters based on the received OBD data, the received occupant data, and the received external data. For example, the plurality of parameters may be determined based on facial recognition and action recognition associated with the occupant 122. In an embodiment, the determined plurality of parameters may include, but are not limited to, the acceleration and deacceleration information of the first vehicle 120A, the speed of the first vehicle 120A, the closeness of the first vehicle 120A with respect to surrounding objects, or a honking from the first vehicle 120A. The determined plurality of parameters may further include, but are not limited to, the intensity of brakes applied by a driver (as the occupant 122) of the first vehicle 120A, a health status of the first vehicle 120A, the usage of seat belt by the occupant 122 of the first vehicle 120A, an efficiency of the driver, or the overcapacity of occupants in the first vehicle 120A. The determined plurality of parameters may further include, but are not limited to, the adherence to traffic rules by the occupant 122 of the first vehicle 120A, the amount of spent time on phone by the occupant 122, or the volume of verbal communication of occupants in the first vehicle 120A. The determined plurality of parameters may further include, but are not limited to, the intensity of volume of music played in the first vehicle 120A, road conditions related to route of the first vehicle 120A, weather conditions related to the route of the first vehicle 120A, information about lane switching for the first vehicle 120A, information about fast U-turn taken by the first vehicle 120A, or weaving/swerving information about the first vehicle 120A.

The plurality of parameters determined from the received OBD data, the occupant data, and/or the external data (i.e. captured from different data sources) and one or more event determined based on the plurality of parameter are depicted in Table 1 below.

TABLE 1

Determination of the plurality of parameters based on the OBD data, occupant data, and external data; and the one or more events determined based on the plurality of parameters.

| Type of Data Source | Plurality of Parameters | One or More Events |
| --- | --- | --- |
| LIDAR sensor | Overtaking distance between vehicles | Aggression level of driver (i.e. aggression in driving behavior of a driver) |
| LIDAR sensor and OBD data | Impact of Intimidation from others on driver | |
| Audio sensor and LIDAR sensor | Honking level and requirement based on situation around vehicle | |
| OBD data and LIDAR sensor | Braking distance (i.e. intensity of applied brakes, states of braking conditions like coming very close to the vehicle (and applying brakes), Applying brake while engine in off condition | |
| OBD data | Acceleration and deceleration | |
| Imaging Sensor | Seat belt usage for occupant | Safe behavior (i.e. adherence to safe driving practices) |
| Imaging Sensor | Overcapacity monitoring inside the vehicle | |

TABLE 1-continued

Determination of the plurality of parameters based on the OBD data, occupant data, and external data; and the one or more events determined based on the plurality of parameters.

| Type of Data Source | Plurality of Parameters | One or More Events |
|---|---|---|
| Imaging Sensor and OBD Data | Adhering to traffic signal conditions and in compliance with policies of MaaS network and mobility provider | Regulatory behavior (i.e. adherence to regulatory policies by driver) |
| Imaging Sensor and Audio Sensor | Driver continuously talking on mobile (i.e. amount of spent time on phone by the occupant) | |
| Imaging Sensor and Audio Sensor | Driver playing loud music (i.e. Intensity of volume of music in vehicle) | Comfort level (i.e. comfort level provided to occupant during trip) |
| Imaging Sensor and Audio Sensor | Passenger noise level (i.e. volume of verbal communication of occupants) | |
| Imaging Sensor and LIDAR sensor | Road conditions (Slippery, Abrupt road, road closure, less visibility) | Hazardous driving conditions and pattern |
| Route map from server, Imaging Sensor and/or Humidity Sensor | Fog alert and wet conditions of road | |
| GPS sensor and OBD data | Information of lane switching, Weaving, Swerving, Side slipping, Fast U-Turn by driver | Rash driving pattern |
| Imaging sensor | Drunken driving situation with occupant | Dispute resolution |
| GPS sensor and LIDAR sensor | Location and timestamp of vehicle | |

As described in Table 1, for example, the LIDAR sensor 304C and the depth sensors (such as, a time-of-flight (ToF) sensor and a direct ToF sensor) may be utilized to measure the distance by which the driver overtakes the surrounding objects and the distance by which the other vehicles overtake the first vehicle 120A. Further, the LIDAR sensor 304C and the OBD data may be utilized to determine the impact of the intimidation from other drivers or pedestrians, and the impact of the intimidation by the driver of the first vehicle 120A. Moreover, the audio sensor 304B and the LIDAR sensor 304C may be utilized to determine surrounding objects of the first vehicle 120A and further determine whether honking by the driver of the first vehicle 120A was necessary at a specific location on the route or not. Similarly, the OBD data and LIDAR sensor 304C may be utilized to determine states of braking conditions, (such as applying the brakes when engine of the first vehicle 120A is in OFF condition or an applying the brakes when the first vehicle 120A may be very close to an object, such as another vehicle on the road). Similarly, based on the occupant data received from the imaging sensor 304A, the seat belt usage of the occupant 122, the overcapacity (i.e. number of occupants) in the first vehicle 120A, and/or drunken driving may be determined as one of the plurality of parameters as shown in Table 1. Similarly, based on the occupant data received from the imaging sensor 304A and the audio sensor 304B, it may be determined that the driver may continuously talk using mobile for large amount of time, or intensity of volume of music played in the first vehicle 120A is high, as one of the plurality of parameters as shown in Table 1. Therefore, the plurality of parameters may be determined based on the received OBD data, the occupant data and the external data as depicted in Table 1.

At 408, the trained AI model 204A may be applied on the determined plurality of parameters. In accordance with an embodiment, the processor 202 of the mobility player system 102 may be configured to apply the trained AI model 204A on the determined plurality of parameters. The trained AI model 204A may be trained on different parameters derived from one or combination of the OBD data, the occupant data, and the external data, for example, as shown in Table 1. The trained AI model 204A may provide one or events related to the first vehicle 120A or related to the occupant 122, based on provided inputs, such as the determined plurality of parameters. In some embodiments, the AI model 204A may be trained for other operations, such as, but not limited to, detection of objects, anomaly, and noise (as described at 404A), a detection of number of occupants in the first vehicle 120A, the audio level (decibel units) of the occupant 122 or music played in the first vehicle 120A, and so forth. The trained AI model 204A may include the one or more trained machine learning models which may utilize algorithms such as, but not limited to, a support vector machine (SVM), a k-nearest neighbors (KNN) algorithm, a random forest algorithm, and the like (such as described, for example, in FIG. 2). The trained AI model 204A may further include the one or more trained neural network models such as, but not limited to, a deep neural network (DNN), a convolutional neural network (CNN), a recurrent neural network (RNN), a CNN-recurrent neural network (CNN-RNN), R-CNN, Fast R-CNN, Faster R-CNN, an artificial neural network (ANN), (You Only Look Once) YOLO network, a Long Short Term Memory (LSTM) network based RNN, CNN+ANN, LSTM+ANN, a gated recurrent unit (GRU)-based RNN, a fully connected neural network, a Connectionist Temporal Classification (CTC) based RNN, a deep Bayesian neural network, a Generative Adversarial Network (GAN), and/or a combination of such networks. In some embodiments, the trained AI model 204A may include numerical computation techniques using data flow graphs. In certain embodiments, the trained AI model 204A may be based on a hybrid architecture of multiple Deep Neural Networks (DNNs).

At 410, the one or more events may be determined. In accordance with an embodiment, the processor 202 of the mobility player system 102 may be configured to determine (or predict) the one or more events related to the first vehicle 120A, or related to the occupant 122 of the first vehicle 120A, based on the application of the trained AI model 204A on the determined plurality of parameters. In accordance with an embodiment, the determined one or more events may include, but is not limited to, the aggression in behavior of the driver (as the occupant 122) of the first vehicle 120A, the adherence to safe driving practices by the driver of the first vehicle 120A, the adherence to regulatory policies by the driver of the first vehicle 120A, the comfort level provided to the passenger (as the occupant 122) of the first vehicle 120A, the hazardous driving conditions, smooth driving pattern of the driver (as the occupant 122) of the first vehicle 120A, the rash driving pattern of the driver, as depicted in Table 1.

For example, as depicted in Table 1, the aggression level of the driver (as an event) may be determined based on, but is not limited to, the overtaking distance of the driver of the first vehicle 120A, the intimidation level of the driver, the amount of honking by the driver, the braking distance, the acceleration and deceleration levels of the driver of the first vehicle 120A. For example, the aggression level of the driver may be high if the driver overtakes the surrounding objects rapidly, the amount of honking is determined to be more than a predefined threshold, or the braking distance is close to other vehicles.

Similarly, the regulatory behavior (as an event) of the driver may be determined based on a determination that the driver adheres to the traffic signal conditions and compliance policies. Furthermore, the comfort level provided of the passenger (as an event) may be determined based on the determination of the amount of time the driver communicates on the phone during the trip, the level of volume of the driver during the communication and/or the level of volume of the music played by the driver in the first vehicle 120A. In an exemplary embodiment, the comfort level of the passenger may be determined to be high, if the level of volume of the music played by the driver is within acceptable limits. Similarly, the comfort level of the passenger may be determined to be high if the amount of time the driver communicates on the phone is less (such as, a few seconds or minutes per hour). In an example, the Hazardous driving conditions (as an event) may be determined based on the determined road and weather conditions (i.e. parameter determined from the OBD/occupant/external data). In another example, a rash driving pattern or smooth driving pattern (as an event) of the driver may be determined from the parameters such, as the information of lane switching, weaving, swerving, side slipping, fast U-turn taken by the driver during the trip, turning the vehicle with a wide radius, as shown in Table 1.

Moreover, the determined one or more events may be utilized for dispute resolution between two parties, such as the passenger of the first vehicle 120A, driver of the first vehicle 120A, and the first mobility provider. For example, information about the determined one or more events, such as the aggression level of the driver, hazardous driving conditions and/or the rash driving patterns of the driver may be used for the dispute resolution, as the driver profile information and the passenger profile information (i.e. generated based on the determined events) may be securely stored in one or more nodes of the MaaS network 104. Furthermore, the mobility player system 102 may receive consent from the passenger for capturing of data (i.e. image or audio) associated with the passenger as the occupant 122, and further the passenger related data and the consent may be stored in the distributed ledger 114 or the distributed ledger sub-nodes 116 of the MaaS network 104. Thus, disputes related to privacy violations may be avoided.

In accordance with an embodiment, the processor 202 of the mobility player system 102 may be configured to determine an identity of a first driver (as the occupant 122) in the first vehicle 120A, based on the determined one or more events. For example, the imaging sensor 304A may be utilized to identify the first driver as the occupant 122. Moreover, the driving pattern (aggressive, rash or smooth) of the driver as the determined one or more events may be utilized to determine the identity of the first driver. For example, an average speed of driving of the first driver, average overtaking distances related to the first driver, average braking distances, volume of communication of the first driver of the first vehicle 120A may be utilized to determine the identity of the first driver (or distinguish the first driver from other drivers), in case a face of the first driver is unrecognizable in the images captured by the imaging sensor 304A.

In accordance with an embodiment, the processor 202 of the mobility player system 102 may utilize the external server 128 (i.e. different from the plurality of MP servers 118) for determination of the one or more events. The processor 202 may be configured to transmit a first set of the OBD data and a first set of the occupant data to the external server 128. The processor 202 may receive the first set of parameters of the plurality of parameters from the external server 128, based on the transmitted first set of the OBD data and the transmitted first set of the occupant data. The first set of parameters may be determined by the external server 128 based on the received first set of the OBD data and the first set of the occupant data from the mobility player system 102. Further, the processor 202 may determine a second set of parameters of the plurality of parameters based on a second set of the OBD data and a second set of the occupant data. The processor 202 may further determine the one or more events related to the first vehicle 120A, or related to the occupant 122 of the first vehicle 120A, based on the application of the trained neural network model on the received first set of parameters (i.e. from the external server 128) and the determined second set of parameters. Thus, the mobility player system 102 may perform partial processing with the external server 128 for the determination of the plurality of parameters and the one or more event. In some embodiments, the processor 202 may utilize the external server 128 for determination of the one or more events for a fast processing of the data (such as, the received OBD data, the occupant data, and the external data) received in high-volume on real-time basis.

At 412, occupants (such as, the passengers and the driver) profile information may be generated. In accordance with an embodiment, the processor 202 may be configured to generate driver profile information based on the determined one or more events. The driver profile information may be associated with the driver, as the occupant 122, of the first vehicle 120A. For example, the driver profile information may include, a driving pattern of the driver of the first vehicle 120A in normal conditions and in hazardous conditions, an adherence to safe driving practices by the driver, a level of comfort provided by the driver to the passenger, an adherence to the regulatory policy by the driver (such as, a no drink-and-drive policy, and a no eat-while-drive policy). The driver profile information may further include a first score card for the driver. The details of the first score card are provided, for example, in FIGS. 5A-5B.

In accordance with an embodiment, the processor 202 may be further configured to generate passenger profile information based on the determined one or more events. The passenger profile information may be associated with the passenger, as the occupant 122, of the first vehicle 120A. For example, the passenger profile information may include, but not limited to, a frequency of trips of the passenger with the plurality of mobility providers associated with the MaaS network 104, types of vehicles booked by the passenger, a history of area of travel of the passenger, an adherence to safe travel practices by the passenger, such as, usage of a seat belt, a low level of volume of conversations of the passenger. The passenger profile information may further include a second score card for the passenger. The details of the second score card are provided, for example, in FIG. 5C.

At 414, the distributed ledger sub-nodes 116 may be updated. In accordance with an embodiment, the processor 202 of the mobility player system 102 may be configured to update the distributed ledger sub-nodes 116. The processor 202 may be configured to transmit the generated driver profile information and the generated passenger profile information to the distributed ledger sub-nodes 116 associated with an MP node (e.g., the first MP node 112A) and a MaaS node (e.g., the first MaaS node 114A) as depicted in 414A in FIG. 4. The processor 202 may store the driver profile information in the driver sub-node 116A and the passenger profile information in the user sub-node 116B. Further, the processor 202 may store the OBD data of the first vehicle 120A as the log information on the document sub-node 116C. Therefore, the distributed ledger sub-nodes 116 (such as, the driver sub-node 116A, the user sub-node 116B, and the document sub-node 116C) may be updated regularly on real-time basis with the generated driver profile information, the generated passenger profile information, and the OBD data of the first vehicle 120A related to different trips, vehicles, and/or occupants associated with different mobility players.

The update of the one or more nodes of the distributed ledger (depicted by 414A) of the MaaS network 104, and notifications send to different parties (such as driver, passengers), based on the determined one or more events is depicted in Table 2 below:

TABLE 2

Update on distributed ledger of MaaS network and notifications to different parities based on determined one or more events

| Determined Events | Actor(s) for notification and update | Actions |
|---|---|---|
| Driving pattern recognition for normal and hazardous conditions | Mobility provider, MaaS Network | Update of the driver profile information updated on the driver sub-node 116A Notification to the MaaS network 104, and the mobility provider about the update on hazardous conditions |
| Driving pattern recognition for rash driving | Mobility provider, Driver, MaaS Network | Update of the driver profile information on the driver sub-node 116A Notification to the driver on priority, Notification to the MaaS network 104, and the mobility provider of the update |
| Adhering to safe driving | Mobility provider, Driver | Update of the driver profile on the driver sub-node 116A Necessary Notification to the MaaS network 104, and the mobility provider of the update Necessary notification to the driver |
| Monitoring the driver behavior | Mobility provider, Driver | Update of the driver profile on the driver sub-node 116A) and notification to the driver Notification to the mobility provider of the update |
| Regulatory Policy behavior monitoring | Mobility provider, MaaS network | Verification of adherence to policies specified by a mobility provider and the MaaS network 104 |
| Dispute Handling | Mobility provider, Driver, Passenger, MaaS Network | Provision of feedback from the passenger to the mobility provider via distributed ledger (e.g., an MP node) Resolution of a dispute by the mobility provider via distributed ledger (e.g., the MP node and associated distributed ledger sub-nodes 116, such |

TABLE 2-continued

Update on distributed ledger of MaaS network and notifications to different parities based on determined one or more events

| Determined Events | Actor(s) for notification and update | Actions |
|---|---|---|
| | | as, the document sub-node 116C) Update of the passenger profile information and driver profile information on the distributed ledger Notification to the MaaS network 104, mobility player of the update. Notification to the driver and passenger |
| Driver profile information | Driver | Update of the driver profile information on the driver sub-node 116A |
| Rash driving | Driver, Mobility provider, MaaS Network | Update of the driver profile information on the driver sub-node 116A and notification to the driver and the mobility provider and the MaaS Network 104 |
| Passenger consent or data recording | Passenger, mobility provider | Provision of consent from the passenger to the mobility provider via the distributed ledger (i.e., the user sub-node 116B) Notification to the mobility player |
| Passenger behavior (seatbelt usage, loud voice) | Passenger, MaaS network | Update of the passenger profile information on the user sub-node 116B) Notification to MaaS network |
| Driver behavior (seatbelt usage, loud voice) | Driver, mobility provider | Update of the driver profile information on the driver sub-node 116A and notification to the driver and the mobility provider |

The distributed ledger sub-nodes 116 associated with one or more MP nodes and one or more MaaS nodes of the MaaS network 104 may be updated frequently based on the determined one or more events as depicted in Table 2. For example, the driving pattern of the driver may be updated in the driver profile information stored on the driver sub-node 116A of the first MP node 112A and the first MaaS node 114A. Furthermore, the information related to dispute handling may be updated in the log information stored on the document sub-node 116C.

In accordance with an embodiment, the processor 202 of the mobility player system 102 may be configured to receive a trip request for a first trip from an electronic device (such as the first electronic device 124) associated with the passenger. The processor 202 may further extract the passenger profile information associated with the passenger, from the distributed ledger sub-nodes 116 (e.g., the user sub-node 116B) associated with the one or more distributed ledger nodes, such as, the first MP node 112A and the first MaaS node 114A. For example, the processor 202 may extract the passenger profile information associated with the passenger that may be registered with the MaaS network 104 or with a particular mobility player. The processor 202 may determine vehicle information, based on the extracted passenger profile information. The vehicle information may be associated with one or more vehicles registered with the first mobility provider and stored on the distributed ledger sub-nodes 116 associated with one or more distributed ledger nodes (such as, the first MP node 112A and the first MaaS node 114A). For example, the vehicle information may include, a type of vehicle, driver associated with the vehicle, a distance of the vehicle from a location of the passenger. In an embodiment, the vehicle information may indicate breakdown status of the vehicles which may be indicated based on the OBD data related to the corresponding vehicle. The vehicle information may further include the driver profile information which may indicate information about the driver associated with the vehicle.

The processor 202 may further assign a vehicle for the first trip based on the extracted passenger profile information and the vehicle information associated with the one or more vehicles. The vehicle may be assigned to the passenger, based on the passenger profile information such as age of the passenger (who may need the vehicle to be driven at a steady rate), health condition of the passenger, and so forth. For example, the passenger may be a pregnant lady who may require a vehicle. Based on the passenger profile information, the processor 202 may assign the vehicle with the driver whose stored driver profile information may specify that the driver adheres to safe driving conditions and may have a smooth or normal driving behavior or pattern. Therefore, the processor 202 of the processor 210 may also extract the driver profile information of different drivers registered with the mobility providers (i.e. to further assign the vehicle and the driver for the first trip) based on the passenger profile information. The processor 202 may further transmit the vehicle information and the driver profile information of a driver of the assigned vehicle, to the electronic device (such as the first electronic device 124) associated the passenger to initiate the first trip. Therefore, the mobility player system 102 may ensure that the vehicles may be assigned based appropriate match between the trip request, the driver profile information, the passenger profile information, and the vehicle information (stored on one or more nodes of the MaaS network 104) such that passenger satisfaction with the mobility player may increase, which may further enhance business profitability for the mobility player. Moreover, the mobility player system 102 may further notify the passenger about the assigned driver in case the assigned driver tries to register for the trip associated with the passenger without an adherence to the policy regulations. For example, the passenger may be notified when the assigned driver may have registered for multiple trips without a required gap between trips (as required by policy regulations), which may affect the driving capabilities of the driver. So, in such cases, the notification may enable the passenger to raise request for assignment of another driver for the trip from the mobility provider.

In accordance with an embodiment, the processor 202 of the mobility player system 102 may be configured to receive regulatory information from a regulatory authority server (not shown). The regulatory authority server may be associated with a specific geographical region. For example, different geographical regions may have different regulatory authority servers. Therefore, the mobility player system 102 may receive the regulatory information from the regulatory authority server associated with a geographical region where the first vehicle 120A may be present. The processor 202 may further receive a first set of health parameters associated with a driver (as the occupant 122) of the first vehicle 120A with respect to the received regulatory information during the first trip of the first vehicle 120A. For example, the first set of health parameters may include a nominal rate of heartbeat of the driver, which may be determined from a biometric sensor (one of the plurality of sensors 218) in the first vehicle 120A. In an exemplary scenario, the received regulatory information may include that the driver needs to take a break of an hour after at most five trips. The driver may thus, not be allowed to accept new trips before completion of the break of an hour after the five trips. Moreover, the imaging sensor 304A may be utilized to determine a level of drowsiness (i.e. first set of health parameters) of the driver while driving the first vehicle 120A. Therefore, the driver may be alerted based on the health parameter received from the imaging sensor 304A (or the biometric sensor) and the received regulatory information. For example, the alert may be provided in case the measured heartbeat may be above a particular threshold value indicated in the received regulatory information. The processor 202 may further transmit information about the first set of health parameters associated with the driver, to the distributed ledger sub-nodes 116 (e.g., the driver sub-node 116A) associated with one or more MP nodes and one or more MaaS nodes of the MaaS network 104. In an embodiment, the first set of health parameters may be updated in the driver profile information and notified to the associated mobility player server.

At 416, notification information may be generated. In accordance with an embodiment, the processor 202 of the mobility player system 102 may be configured to generate the notification information based on the determined one or more events. The processor 202 may be further configured to transmit the generated notification information (including the information about the determined one or events) to an electronic device (such as the first MP server 118A, the second electronic device 220, and the first electronic device 124) associated with at least one of the first mobility provider, the first vehicle 120A, or the occupant 122 of the first vehicle 120A as depicted in 416A in FIG. 4. Different examples of the notification for the determined events are shown in Table 2.

The generated notification information may include information about the determined one or events, for example, driver driving behavior pattern, rash driving information, information related to adherence to safe driving, information about adherence to regulatory policies, dispute handling information, information related to passenger behavior, information related to trip requests, and so forth.

In accordance with an embodiment, the processor 202 of the mobility player system 102 may be configured to receive the regulatory information from the regulatory authority server. Based on the determined plurality of parameters, the processor 202 may further transmit, the received regulatory information to the first electronic device 124 associated with a driver (as the occupant 122) of the first vehicle 120A or the second electronic device 220 associated with the first vehicle 120A. For example, the received regulatory information may include details associated with the first trip, a speed limit in the geographical region, and traffic rules associated with the geographical region. In case of determination that the speed information (i.e. one of the parameters determined from the OBD data) of the first vehicle 120A exceeds or not compliant with the speed limit (i.e. indicated by the received regulatory information), the processor 202 may transmit the received regulatory information to the first vehicle 120A, via the second electronic device 220 or to the occupant 122 (driver or the passenger) via the first electronic device 124 to alert about the regulation policies of the geo-graphical region where the first vehicle 120A may be located.

FIGS. 5A-5C collectively illustrate exemplary tables for generation of a score card for an occupant of a vehicle, in accordance with an embodiment of the disclosure. FIGS. 5A-5C are described in conjunction with elements from FIGS. 1, 2, 3 and 4. With reference to FIG. 5A, there is shown an exemplary table 500A. The exemplary table 500A depicts generation of a first score card for the driver (as the occupant 122) under normal conditions (such as normal weather conditions). The first score card may indicate score or ranking information for the driver associated with a mobility player.

The exemplary table 500A depicts a plurality of weights assigned to the plurality of parameters, based on an importance of each determined parameter of the plurality of parameters. In accordance with an embodiment, the processor 202 of the mobility player system 102 may be configured to generate the first score card associated with the driver of the first vehicle 120A, based on one or more of the determined plurality of parameters. In some embodiments, the plurality of weights may be assigned to different events (and plurality of parameters) and the first score card may be generated based on the plurality of weights assigned to different events and plurality of parameters. The first score card may indicate a behavioral pattern of the driver, such as, whether the driver rashly drives or adheres to the safety measures.

In an embodiment, each of the plurality of weights may be assigned to each parameter or event in a range of 0 to 1, such as a weight "1" being a highest weight with highest importance. For example, the first score card (or score information) under normal conditions may be a weighted aggregate score for the determined plurality of parameters or the determined events (such as driving pattern of the driver, the adherence to safety by the driver, and behavior of the driver). In some embodiments, the diving pattern of the driver may be determined by, but not limited to, speed in rotation per minutes (rpm) of the first vehicle 120A and engine load parameters of the first vehicle 120A, as shown in FIG. 5A.

In an example, a weight of "0.4" may be assigned to a smooth driving parameter of the plurality of parameters, a weight of "0.3" may be assigned to a parameter indicative of an efficiency of the driver (such as in terms of braking parameter and acceleration), and a weight of "0.8" may be assigned to a parameter indicative of the aggression level of the driver (such as in terms of overtaking distances, intimidation, honking level, acceleration and deceleration). Similarly, weights may be assigned to each parameter based on the importance of the parameter. In an embodiment, the weights may be assigned to each event of the one or more events. In an embodiment, the weights may be fixed for each type of event or parameter. In another embodiment, the weights may be assigned dynamically to different events and/or parameters based on different factors, such as, but not limited to, driver behavior (i.e. indicated by the driver profile information), route travel followed in a trip, a distance to be travelled in a trip, passenger preferences (i.e. indicated in the passenger profile information), and the like. Based on different factors, different weights may be assigned to each determined event or parameter. For example, for a old-aged person or a pregnant lady, weight assigned for the smooth driving may be higher than the efficiency of the driver.

In accordance with an embodiment, the memory 204 may be configured to store a plurality of first scores associated with the determined plurality of parameters or the determined one or more events. The plurality of first scores may be determined based on the determination of the one or more events associated with the driver. For example, the plurality of first scores may be defined in a range of 0 to 10, such as a score of "10" being a highest score of the plurality of first scores. In an exemplary scenario, a score of "6" may be assigned to the driver for smooth driving pattern of the driver, a score of "5.8" may be assigned to the driver based on the parameter as efficiency of the driver, and a score of "7" may be assigned to the driver for maintaining a low aggression level, as shown in FIG. 5A. Similarly, the plurality of first scores may be assigned to the driver based on other parameters and the events of the one or more events as depicted in FIG. 5A. The mobility player system 102 may calculate the first score card (under normal conditions) for the driver based on a weighted aggregate of the plurality of first scores. For example, the first score under normal conditions may be "21.6" as depicted in FIG. 5A. The calculation of the first score card (or score information) based on the aggregation of the plurality of first scores and the assigned weights may ensure that appropriate importance is given to each determined parameter/event for the calculation of scores for the driver. Based on the calculated first score card, the driver may be rewarded by the corresponding mobility player for achieving high scored driving behavior pattern. In some embodiments, the weights may be provided as configurable items by the MaaS network 104 for adherence to certain policy standards for specific regions.

With reference to FIG. 5B, there is shown an exemplary table 500B for generation of the first score card under hazardous conditions (such as the hazardous weather conditions) for the driver of the first vehicle 120A, based on one or more of the determined plurality of parameters or the events.

In some embodiments, the parameter hazardous weather pattern may be assigned a weight of "0.5". Similarly, weights may be assigned to other parameters and events as described in FIG. 5A. The weight for the parameter hazardous weather pattern may be assigned based on a level of difficulty of driving in the hazardous weather conditions (such as less visibility, slippery roads, abrupt route). The first score (or the first score card) under hazardous weather conditions may be calculated based on a weighted aggregate of the plurality of first scores. For example, the first score calculated for the driver under hazardous weather conditions may be "20.2", as depicted in FIG. 5B. In accordance with an embodiment, the first score card may allow migration (or switching) of the driver from one mobility provider to another mobility provider, as the first score card may depict a behavioral pattern of the driver. The mobility player system 102 may analyze the generated first score card of the driver during switching of the driver from one mobility provider to another mobility provider.

With reference to FIG. 5C, there is shown an exemplary table 500C for generation of a second score card associated with the passenger (as the occupant) 122 of the first vehicle 120A. In accordance with an embodiment, the processor 202 of the mobility player system 102 may be configured to generate the second score card associated with the passenger. The second score card may indicate a behavioral pattern of the passenger.

The second score card associated with the passenger may depend on parameters such as, but not limited to, passenger travelling information, the adherence to safety by the passenger, and the passenger behavior. For example, the passenger travelling information may include a frequency of the trips of the passenger, a type of vehicle booked or a vehicle preference of the passenger, and an area of travel of the passenger. The plurality of weights may be assigned to each parameter of the plurality of parameters or events. For example, a weight "0.4" may be assigned to the event "passenger travelling information", a weight "0.6" may be assigned to the event "adherence to safety", and a weight "0.5" may be assigned to the event "passenger behavior".

In an embodiment, a plurality of second scores may be assigned to each parameter of the plurality of parameters or determined events associated with the passenger as the occupant 122 of the first vehicle 120A. A score of "7" may be assigned to the passenger for the event "passenger travelling information" if the passenger travels frequently and prefers premium vehicles. Similarly, scores may be assigned to other events or parameters of the plurality of parameters. The second score may be calculated based on a weighted aggregate of the plurality of second scores. For example, the second score associated with the passenger may be "10.3", as depicted in FIG. 5C.

In accordance with an embodiment, the second score card may allow targeted marketing of MaaS services to a specific set of users (such as passenger) based on the preferences of the passenger. For example, a paid subscription and discount may be offered to a passenger who may prefers premium vehicles and travels more frequently with a mobility provider and have higher second score card (or second score). Moreover, the mobility player system 102 may automatically suggest and assign a mobility provider or vehicle for the trip to the passenger based on the preferences of the passenger or based on the generated score card for the passenger. Thus, the passenger need not manually select a mobility provider from the plurality of mobility providers. Further, targeted marketing of the MaaS services to the passengers provided by the disclosed mobility player system 102 may increase a revenue of the MaaS network 104 and the mobility providers.

The mobility player system 102 of the present disclosure may provide regulatory policy behavior monitoring. The regulatory policy behavior monitoring may be provided at various levels such as, at the MaaS network 104 level, the mobility provider level or at the level of government agencies that may operate in a specific geographical region. The regulatory policy behavior monitoring may be implemented by monitoring the MaaS network 104 for different level policies with the help of one or more nodes of the MaaS network 104 and the distributed ledger sub-nodes 116.

The mobility player system 102 may further provide monitoring and reporting of a vehicle, such as the first vehicle 120A, of an owner. The monitoring and reporting of the vehicle may allow transparency and trust between the vehicle owner and the mobility provider due to detailed level of profiling and the dispute handling mechanism based on storage of trip data, the driver profile information, and the passenger profile information on the distributed ledger sub-nodes 116. Moreover, the mobility player system 102 may further allow detection of overtrips (such as based on the regulatory information) by a particular driver, switching between drivers (such as, detection of another driver instead of the assigned driver based on the driving pattern), and the vehicle health status (such as based on the OBD data). The mobility player system 102 may further provide access to the driver profile information and the dispute handling records stored in the distributed ledger sub-nodes 116. The access may be provided via the mobility provider for cases such as, a vehicle provided by the mobility provider, a vehicle owned by the driver and subscribed to the mobility provider, and the vehicle owned by a public user and rented to the mobility provider (such as, with or without the driver).

The mobility player system 102 may further provide customized or personalized services to a passenger according to specific requirements of the passenger. For example, the personalized services may be provided to a passenger, such as, a pregnant woman, who may request to travel within a certain speed limit with careful driving at speed breakers. The driver profile information may be analyzed to assign a suitable driver based on the passenger requests. In another example, the personalized services may be provided to a passenger who may require to attend a meeting or a call during the trip or a passenger who may be a senior citizen who may require post-surgery care. Thus, the driver with smooth driving skills may be assigned in such cases. The mobility player system 102 may further provide monitoring of the behavior pattern of the drivers or passengers subscribed to the mobility player and the MaaS network 104, and may provide feedback to the MaaS network 104. Thus, it may allow the MaaS network 104 to provide personalized recommendations based on the feedbacks, to maintain customer relations and ensure customer satisfaction for the passengers. The mobility player system 102 of the present disclosure may further ensure profitability for the plurality of mobility providers due to the provided customized services. The mobility player system 102 may thereby ensure efficient, secure, and profitable fleet operations associated with the plurality of mobility providers.

Figure 6:
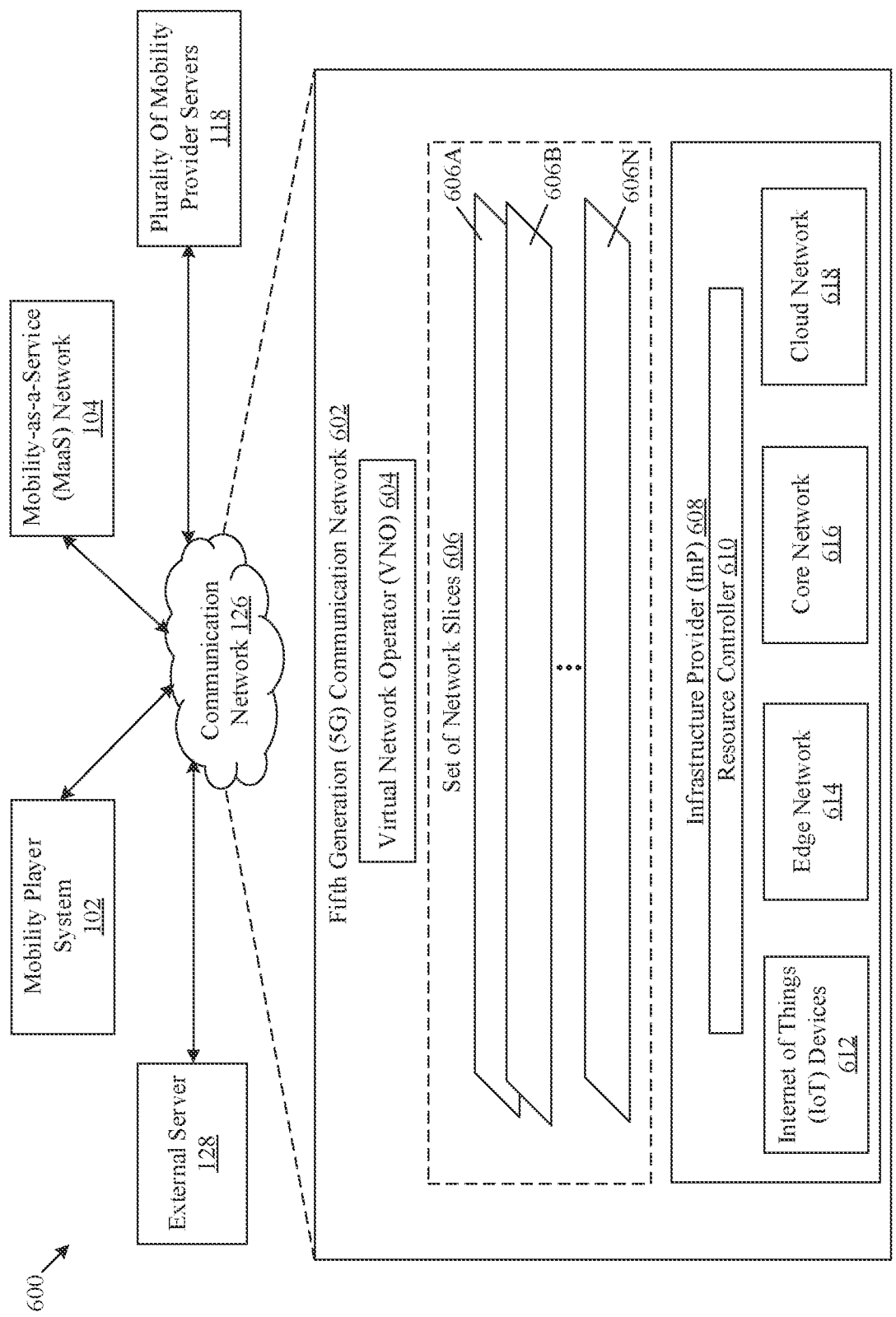
FIG. 6 is a scenario diagram of an exemplary $5^{th}$ generation (5G) communication network associated with a mobility player system, a MaaS network and a plurality of mobility provider servers of FIG. 1, in accordance with an embodiment of the disclosure.

FIG. 6 is a scenario diagram of an exemplary $5^{th}$ generation (5G) communication network associated with a mobility player system, a MaaS network and a plurality of mobility provider servers of FIG. 1, in accordance with an embodiment of the disclosure. FIG. 6 is explained in conjunction with elements from FIGS. 1, 2, 3, 4, 5A, 5B, and 5C. With reference to FIG. 6, there is shown an exemplary scenario 600 of a 5th generation (5G) communication network. The exemplary scenario 600 includes the mobility player system 102, the MaaS network 104, the plurality of mobility provider servers 118, the external server 128, and the communication network 126 that may communicatively couple the mobility player system 102, the MaaS network 104, the external server 128, and the plurality of mobility provider servers 118 with one another. In an embodiment, the communication network 126 may be a 5G communication network, such as, a fifth generation (5G) communication network 602, shown in FIG. 6.

The 5G communication network 602 may include a virtual network operator (VNO) 604, a set of network slices 606, and an infrastructure provider (InP) 608. The set of network slices 606 may include a first network slice 606A, a second network slice 606B, . . . and an Nth network slice 606N. The infrastructure provider 608 may include a resource controller 610 and a plurality of network resources, such as, but not limited to, Internet of Things (IoT) devices 612, an edge network 614, a core network 616, and a cloud network 618.

In an exemplary scenario, the first network slice 606A may perform determination of the one or more events related to the first vehicle 300A. The second network slice 606B may transmit the information about the determined one or more events to the distributed ledger 112 and the distributed ledger 114. Similarly, the Nth network slice 606N may perform a different operation than the first network slice 606A and the second network slice 606B. The N number of network slices shown in FIG. 6 is presented merely as an example. The set of network slices 606 may include only one network slice or more than N network slices in the 5G communication network 602, without deviation from the scope of the disclosure. For the sake of brevity, only N network slices have been shown in FIG. 6. However, in some embodiments, there may be more than N network slices, without limiting the scope of the disclosure.

In an embodiment, the VNO 604 may be configured to receive Quality of Service (QoS) requirements from the mobility player system 102. Examples of the QoS requirements may include, but are not limited to, a bandwidth requirement (e.g., 100 Mbps), a network latency requirement (e.g., a maximum latency of 10 milli-seconds), a network jitter requirement (e.g., a maximum jitter of 1 milli-second), and a network recovery requirement (e.g., a less than 1 second network recovery). The VNO 604 may be further configured to receive network function or protocols information from the mobility player system 102. Examples of the network function or protocols information may include information related to, but not limited to, mobility context management, location tracking, paging, reachability management, handover control, mobility anchoring, and path optimization.

The VNO 604 may be configured to analyze the received QoS requirements and received network function or protocols information. The VNO 604 may be configured to transmit a request to the InP 608 for network resource allocation for establishment of one or more communication links between the mobility player system 102, the MaaS network 104, the plurality of MaaS servers 118, and servers (such as the external server 128, the traffic server, the vehicle regulatory server, the regulatory authority server, or other road assistance servers).

Each of the set of network slices 606 may split network resources of the 5G communication network 602 into logical or virtual networks to provide end-to-end customized mobile networks for certain pre-determined use cases that may meet certain Service Level Agreements (SLAs) for the concerned use cases. The set of network slices 606 may include the various network slices 606A-606N, each of which may support a certain application service. For example, the first network slice 606A may support an automotive application service. The second network slice 606B may support a seamless infotainment application service. Similarly, the Nth network slice 606N may support sensors and actuators. In an embodiment, each of the mobility player system 102, the MaaS network 104, and the plurality of mobility provider servers 118 may use network resources from the first network slice 606A that may support the automotive application service.

The InP 608 may be configured to receive the request from the VNO 604, for the network resource allocation associated with the mobility player system 102. The resource controller 610 of the InP 608 may be configured to serve the request for the network resource allocation by either allocation/creation of a new network resource (such as a virtual network) or adjustment of existing one or more network resources. The network resource allocation may be served from the plurality of network resources of the InP 608, such as, but not limited to, the IoT devices 612, the edge network 614, the core network 616, and the cloud network 618.

The IoT devices 612 may include a plurality of sensors and/or a plurality of actuators that may be connected to a network (e.g., the edge network 614). The edge network 614 may include a plurality of switch or gateway devices that may be located at an entry or exit point between networks and may have a computing capability to process or store information from connected devices, such as, the IoT devices 612. The core network 616 may include networking devices that may constitute a core service-based and multi-access architecture of the 5G communication network 602. The cloud network 618 may include networking devices that may include a non-core, Internet-based distributed computing architecture of the 5G communication network 602. In some embodiments, the mobility provider virtual machine may be employed as an edge node (such as a 5G edge node). The edge node may be configured to perform one or more operations performed by the mobility player system 102. It may be noted that the scenario 600 shown in FIG. 6 is for exemplary purposes and should not be construed to limit the scope of the disclosure.

Figure 7:
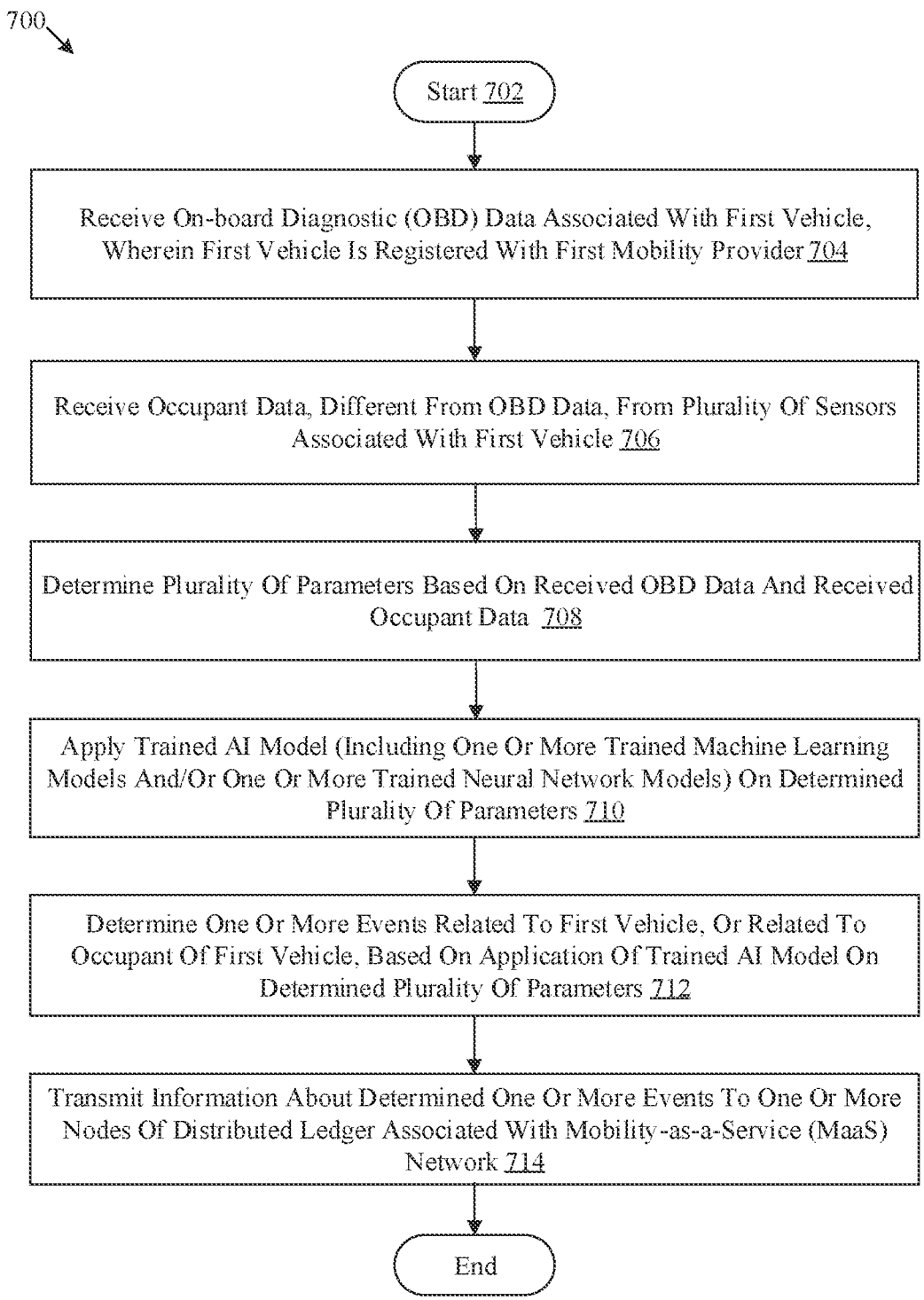
FIG. 7 is a flowchart that illustrates an exemplary method for event determination for vehicles and occupants of mobility providers on a MaaS platform, in accordance with an embodiment of the disclosure.

FIG. 7 is a flowchart that illustrates an exemplary method for event determination for vehicles and occupants of mobility providers on a MaaS platform, in accordance with an embodiment of the disclosure. FIG. 7 is described in conjunction with elements from FIGS. 1, 2, 3, 4, 5A, 5B, 5C, and 6. With reference to FIG. 7, there is shown a flowchart 700. The exemplary method of the flowchart 700 may be executed by any computing system, for example, by the mobility player system 102 of FIG. 1 or the processor 202 in FIG. 2. The exemplary method of the flowchart 700 may start at 702 and proceed to 704.

At 704, the OBD data associated with the first vehicle 120A may be received. In accordance with an embodiment, the processor 202 of the mobility player system 102 may be configured to receive the OBD data associated with the first vehicle 120A from the OBD data interface 216 of the first vehicle 120A. The first vehicle 120A may be registered with the first mobility provider. The details of the reception of the OBD data are provided, for example, in FIG. 4.

At 706, the occupant data, different from the OBD data, may be received from the plurality of sensors 218. In accordance with an embodiment, the processor 202 of the mobility player system 102 may be configured to receive the occupant data from the plurality of sensors 218 of the first vehicle 120A. The occupant data may be different from the OBD data. The details of the reception of the occupant data are provided, for example, in FIG. 4.

At 708, the plurality of parameters may be determined based on the received OBD data and the received occupant data. In accordance with an embodiment, the processor 202 of the mobility player system 102 may be configured to determine the plurality of parameters based on the received OBD data and the received occupant data. Examples of the plurality of parameters may include, but are not limited to, acceleration and deacceleration information of the first vehicle 120A, the speed of the first vehicle 120A, the closeness of the first vehicle 120A with respect to surrounding objects, the honking by the first vehicle 120A, and the intensity of brakes applied by the driver (as the occupant 122) of the first vehicle 120A or other parameters shown in Table 1. The details of the determination of the plurality of parameters are provided, for example, in FIG. 4.

At 710, the trained AI model 204A may be applied on the determined plurality of parameters. In accordance with an embodiment, the processor 202 of the mobility player system 102 may be configured to apply the trained AI model 204A on the determined plurality of parameters. The trained AI model 204A may include at least one of: the one or more trained machine learning models or the one or more trained neural network models. The details of the application of the trained AI model 204A on the plurality of parameters are provided, for example, in FIG. 4.

At 712, the one or more events related to the first vehicle 120A or related to the occupant 122 of the first vehicle 120A may be determined. In accordance with an embodiment, the processor 202 of the mobility player system 102 may be configured to determine the one or more events related to the first vehicle 120A or the occupant 122 of the first vehicle 120A, based on the application of the trained AI model 204A on the determined plurality of parameters. The details of the determination of the one or more events are provided, for example, in FIG. 4.

At 714, the information about the determined one or more events may be transmitted to one or more nodes of a distributed ledger associated with the MaaS network 104. In accordance with an embodiment, the processor 202 of the mobility player system 102 may be configured to transmit the information about the determined one or more events to the one or more nodes of the distributed ledger associated with the MaaS network 104. Examples of the one or more nodes may include the driver sub-node 116A, the user sub-node 116B, and the document sub-node 116C, associated with one or more MP nodes (e.g., the first MP node 112A) and one or more MaaS nodes (e.g., the first MaaS node 114A). The driver sub-node 116A of the distributed ledger sub-nodes 116 may store driver profile information associated with mobility providers of the MaaS network 104. The user sub-node 116B of the distributed ledger sub-nodes 116 may store user (or passenger) information associated with the mobility providers of the MaaS network 104. The document sub-node 116C of the distributed ledger sub-nodes 116 may store log information including the OBD data associated with the vehicles 120A-120N of the mobility providers of the MaaS network 104. Moreover, the document sub-node 116C may store notification information generated based on the determined one or events associated with the MaaS network 104. The details of the transmission and notifications of the information about the determined one or more events are provided, for example, in FIG. 4. Control may pass to end.

Although the flowchart 700 illustrates discrete operations, such as 704, 706, 708, 710, 712, and 714 the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer readable medium and/or storage medium having stored thereon, instructions executable by a machine and/or a computer (for example, the mobility player system 102). The instructions may cause the machine and/or computer (for example, the mobility player system 102) to perform operations for event determination for vehicles (such as, a first vehicle 120A) and occupants (such as the occupant 122) of a mobility provider (such as, the first mobility provider) on MaaS network (such as, the MaaS network 104). The operations may include reception of on-board diagnostic (OBD) data associated with the first vehicle 120A. The first vehicle 120A may be registered with the first mobility provider. The operations may further include reception of occupant data, different from the OBD data, from a plurality of sensors (such as, the plurality of sensors 218) associated with the first vehicle 120A. The operations may further include determination of a plurality of parameters based on the received OBD data and the received occupant data. Furthermore, the operations may include application of a trained AI model (such as, the trained AI model 204A including at least one of: one or more trained machine learning models or one or more trained neural network models) on the determined plurality of parameters. The operations may further include determination of one or more events related to the first vehicle 120A or related to the occupant 122 of the first vehicle 120A, based on the application of the trained AI model 204A on the determined plurality of parameters. The operations may further include transmission of information about the determined one or more events to one or more nodes of a distributed ledger (such as, the distributed ledger sub-nodes 116) associated with the MaaS network 104.

Exemplary aspects of the disclosure may include a mobility player system (such as the mobility player system 102). The mobility player system 102 may include a processor (such as, the processor 202) and a memory (such as, the memory 204) configured to store a trained AI model (such as the trained AI model 204A including at least one of: one or more trained machine learning models or one or more trained neural network models). The processor 202 may be configured to receive on-board diagnostic (OBD) data associated with a first vehicle (such as the first vehicle 120A). The first vehicle 120A may be registered with the first mobility provider. The processor 202 may further be configured to receive occupant data, different from the OBD data, from a plurality of sensors (such as, the plurality of sensors 218) associated with the first vehicle 120A. The processor 202 may be further configured to determine a plurality of parameters based on the received OBD data and the received occupant data. Furthermore, the processor 202 may be configured to apply a trained neural network model (such as, the trained AI model 204A) on the determined plurality of parameters. The processor 202 may be further configured to determine one or more events related to the first vehicle 120A, or related to an occupant (such as the occupant 122) of the first vehicle 120A, based on the application of the trained AI model 204A on the determined plurality of parameters. The processor 202 may be further configured to transmit information about the determined one or more events to one or more nodes of a distributed ledger (such as the distributed ledger sub-nodes 116 of the first MP node 112A and the first Mobility-as-a-Service (MaaS) node 114A) associated with a MaaS network (such as, the MaaS network 104).

In accordance with an embodiment, the processor 202 may be further configured to generate notification information based on the determined one or more events and transmit the generated notification information to an electronic device (such as the first electronic device 124 or the second electronic device 220) associated with at least one of the first mobility provider, the first vehicle 120A, or the occupant 122 of the first vehicle 120A.

In accordance with an embodiment, the processor 202 may be further configured to generate driver profile information based on the determined one or more events. The driver profile information may be associated with a driver, as the occupant 122, of the first vehicle 120A. The processor 202 may be further configured to transmit the generated driver profile information to the one or more nodes of the distributed ledger (e.g., the distributed ledger sub-nodes 116) associated with the MaaS network 104.

In accordance with an embodiment, the processor 202 may be further configured to generate passenger profile information based on the determined one or more events. The passenger profile information may be associated with a passenger, as the occupant 122, of the first vehicle 120A. The processor 202 may further transmit the generated passenger profile information to the one or more nodes of the distributed ledger (e.g., the distributed ledger sub-nodes 116) associated with the MaaS network 104.

In accordance with an embodiment, the processor 202 may be further configured to receive a trip request for a first trip from an electronic device (such as the first electronic device 124) associated with the passenger. The processor 202 may further extract the passenger profile information associated with the passenger, from the one or more nodes of the distributed ledger (e.g., the distributed ledger sub-nodes 116) associated with the MaaS network 104. The processor 202 may further determine, based on the extracted passenger profile information, vehicle information which is associated with one or more vehicles registered with the first mobility provider and stored on the one or more nodes of the distributed ledger (e.g., the distributed ledger sub-nodes 116). The processor 202 may further be configured to assign a vehicle for the first trip based on the extracted passenger profile information and the vehicle information associated with the one or more vehicles and transmit the vehicle information and driver profile information of a driver of the assigned vehicle, to the electronic device associated with the passenger.

In accordance with an embodiment, the determined plurality of parameters include at least one of acceleration and deacceleration information of the first vehicle 120A, the speed of the first vehicle 120A, the closeness of the first vehicle 120A with respect to surrounding objects, a honking by the first vehicle 120A, an intensity of brakes applied by a driver as the occupant of the first vehicle 120A, the health status of the first vehicle 120A, the usage of seat belt by the occupant 122 of the first vehicle 120A, an efficiency of the driver, an overcapacity of occupants in the first vehicle 120A, an adherence to traffic rules by the occupant 122 of the first vehicle 120A, the amount of spent time on phone by the occupant 122, the volume of verbal communication of occupants in the first vehicle 120A, the intensity of volume of music in the first vehicle 120A, road conditions related to route of the first vehicle 120A, weather conditions related to the route of the first vehicle 120A, information about lane switching for the first vehicle 120A, information about fast U-turn taken by the first vehicle 120A, weaving information about the first vehicle, or swerving information about the first vehicle 120A.

In accordance with an embodiment, the determined one or more events include at least one of the aggression in behavior of the driver as the occupant 122 of the first vehicle 120A, the adherence to safe driving practices by the driver of the first vehicle 120A, an adherence to regulatory policies by the driver of the first vehicle, the comfort level provided to the passenger as the occupant 122 of the first vehicle 120A, the hazardous driving conditions, or the rash driving pattern of the driver as the occupant 122 of the first vehicle 120A.

In accordance with an embodiment, the processor 202 may be further configured to receive external data from a server. The external data comprises at least one of information about road conditions, information about weather conditions, traffic update on a route of travel, or a route map of the route of travel of the first vehicle 120A.

In accordance with an embodiment, the processor 202 may be further configured to receive one or more of the OBD data and the occupant data, via a 5th generation (5G) communication network. In accordance with an embodiment, the processor 202 may be further configured to transmit a service requirement comprising a Quality of Service (QoS) requirement and a set of mobility network management functions to a virtual network operator (VNO). The virtual network operator may receive the transmitted service requirement and transmit, based on the received service requirement, a network resource request to an infrastructure provider associated with the 5G communication network. In accordance with an embodiment, the infrastructure provider may create a virtual network to allocate network resources of the 5G communication network in accordance with the received network resource request.

In accordance with an embodiment, the processor 202 may be further configured to receive regulatory information from a regulatory authority server and transmit, based on the determined plurality of parameters, the received regulatory information to at least one of the first electronic device 124 associated with a driver, as the occupant 122, of the first vehicle 120A or the second electronic device 220 associated with the first vehicle 120A.

In accordance with an embodiment, the processor 202 may be further configured to generate a first score card associated with the driver as the occupant 122 of the first vehicle 120A, based on one or more of the determined plurality of parameters or based on the determined one or more events. The first score card may indicate a behavioral pattern of the driver.

In accordance with an embodiment, the memory 204 may be further configured to store a plurality of first scores associated with the determined plurality of parameters or the determined one or more events. The processor 202 may be configured to generate the first score card based on a weighted aggregation of the plurality of first scores for the determined plurality of parameters or the determined one or more events.

In accordance with an embodiment, the processor 202 may be further configured to generate a second score card associated with a passenger as the occupant 122 of the first vehicle 120A based on one or more of the determined plurality of parameters or based on the determined one or more events. The second score card may indicate a behavioral pattern of the passenger.

In accordance with an embodiment, the processor 202 may be further configured to receive regulatory information from a regulatory authority server. The processor 202 may further receive a first set of health parameters associated with the driver, as the occupant 122, of the first vehicle 120A with respect to the received regulatory information during a first trip of the first vehicle 120A. The processor 202 may further transmit information about the first set of health parameters associated with the driver, to the one or more nodes of the distributed ledger (e.g., the distributed ledger sub-nodes 116) associated with the MaaS network 104.

In accordance with an embodiment, the processor 202 may be further configured to determine an identity of a first driver as the occupant 122 in the first vehicle 120A, based on one or more of the determined one or more events.

In accordance with an embodiment, the processor 202 may be further configured to transmit a first set of the OBD data and a first set of the occupant data to an external server (such as the external server 128). The processor 202 may further receive a first set of parameters of the plurality of parameters from the external server, based on the transmitted first set of the OBD data and the transmitted first set of the occupant data. Furthermore, the processor 202 may determine a second set of parameters of the plurality of parameters based on a second set of the OBD data and a second set of the occupant data. The processor 202 may further determine the one or more events related to the first vehicle 120A, or related to the occupant 122 of the first vehicle 120A, based on the application of the trained AI model 204A on the received first set of parameters and the second set of parameters of the plurality of parameters.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. A mobility player system, comprising:
   a memory configured to store a trained artificial intelligence (AI) model including at least one of:
      at least one trained machine learning model or at least one trained neural network model; and
   a processor configured to:
      receive on-board diagnostic (OBD) data associated with a first vehicle, wherein the first vehicle is registered with a first mobility provider;
      receive occupant data, different from the OBD data, from a plurality of sensors associated with the first vehicle;
      determine a plurality of parameters based on the received OBD data and the received occupant data, wherein the determined plurality of parameters include information related to an overcapacity of occupants in the first vehicle;
      apply the trained AI model on the determined plurality of parameters;
      determine at least one event related to the first vehicle, or related to an occupant of the first vehicle, based on the application of the trained AI model on the determined plurality of parameters; and
      transmit information about the determined at least one event to at least one node of a distributed ledger associated with a Mobility-as-a-Service (MaaS) network.

2. The mobility player system according to claim 1, wherein the processor is further configured to:
   generate notification information based on the determined at least one event; and
   transmit the generated notification information to an electronic device associated with at least one of the first mobility provider, the first vehicle, or the occupant of the first vehicle.

3. The mobility player system according to claim 1, wherein the processor is further configured to:
   generate driver profile information based on the determined at least one event, wherein the driver profile information is associated with a driver, as the occupant, of the first vehicle; and
   transmit the generated driver profile information to the at least one node of the distributed ledger associated with the MaaS network.

4. The mobility player system according to claim 1, wherein the processor is further configured to:
   generate passenger profile information based on the determined at least one event, wherein the passenger profile information is associated with a passenger, as the occupant, of the first vehicle; and
   transmit the generated passenger profile information to the at least one node of the distributed ledger associated with the MaaS network.

5. The mobility player system according to claim 4, wherein the processor is further configured to:
   receive a trip request for a first trip from an electronic device associated with the passenger;
   extract the passenger profile information associated with the passenger, from the at least one node of the distributed ledger associated with the MaaS network;
   determine, based on the extracted passenger profile information, vehicle information which is associated with at least one vehicle registered with the first mobility provider and stored on the at least one node of the distributed ledger;
   assign a vehicle for the first trip based on the extracted passenger profile information and the vehicle information associated with the at least one vehicle; and
   transmit the vehicle information and driver profile information of a driver of the assigned vehicle, to the electronic device associated the passenger.

6. The mobility player system according to claim 1, wherein the determined plurality of parameters include at least one of acceleration and deacceleration information of the first vehicle, a speed of the first vehicle, a closeness of the first vehicle with respect to surrounding objects, honking from the first vehicle, an intensity of brakes applied by a driver as the occupant of the first vehicle, an efficiency of the driver, a health status of the first vehicle, a usage of seat belt by the occupant of the first vehicle, an adherence to traffic rules by the occupant of the first vehicle, an amount of spent time on phone by the occupant, a volume of verbal communication of occupants in the first vehicle, an intensity of volume of music in the first vehicle, road conditions related to route of the first vehicle, weather conditions related to the route of the first vehicle, information about lane switching for the first vehicle, information about fast U-turn taken by the first vehicle 120A, weaving information about the first vehicle, or swerving information about the first vehicle.

7. The mobility player system according to claim 1, wherein the determined at least one event include at least one of an aggression in behavior of a driver as the occupant of the first vehicle, an adherence to safe driving practices by the driver of the first vehicle, an adherence to regulatory policies by the driver of the first vehicle, a comfort level provided to a passenger as the occupant of the first vehicle, a hazardous driving conditions, or a rash driving pattern of the driver as the occupant of the first vehicle.

8. The mobility player system according to claim 1, wherein the processor is further configured to:
receive external data from a server, wherein the external data comprises at least one of information about road conditions, information about weather conditions, traffic update on a route of travel, or a route map of the route of travel of the first vehicle; and
determine the plurality of parameters based on the received external data, the OBD data, and the occupant data.

9. The mobility player system according to claim 1, wherein the processor is configured to receive at least one of the OBD data and the occupant data, via a 5th generation (5G) communication network.

10. The mobility player system according to claim 9, wherein the processor is further configured to transmit a service requirement comprising a Quality of Service (QOS) requirement and a set of mobility network management functions to a virtual network operator (VNO), wherein the virtual network operator:
receives the transmitted service requirement; and
transmits, based on the received service requirement, a network resource request to an infrastructure provider associated with the 5G communication network.

11. The mobility player system according to claim 10, wherein the infrastructure provider creates a virtual network to allocate network resources of the 5G communication network based on the received network resource request.

12. The mobility player system according to claim 1, wherein the processor is further configured to:
receive regulatory information from a regulatory authority server; and
transmit, based on the determined plurality of parameters, the received regulatory information to at least one of a first electronic device associated with a driver, as the occupant, of the first vehicle or a second electronic device associated with the first vehicle.

13. The mobility player system according to claim 1, wherein the processor is further configured to generate a first score card associated with a driver as the occupant of the first vehicle, based on at least one of the determined plurality of parameters or based on the determined at least one event, and wherein the first score card indicates a behavioral pattern of the driver.

14. The mobility player system according to claim 13, wherein the memory is further configured to store a plurality of first scores associated with the determined plurality of parameters or the determined at least one event, and wherein the processor is further configured to generate the first score card based on a weighted aggregation of the plurality of first scores for the determined plurality of parameters or the determined at least one event.

15. The mobility player system according to claim 1, wherein the processor is further configured to generate a second score card associated with a passenger as the occupant of the first vehicle, based on at least one of the determined plurality of parameters or based on the determined at least one event, and wherein the second score card indicates a behavioral pattern of the passenger.

16. The mobility player system according to claim 1, wherein the processor is further configured to:
receive regulatory information from a regulatory authority server;
receive a first set of health parameters associated with a driver, as the occupant, of the first vehicle with respect to the received regulatory information during a first trip of the first vehicle; and
transmit information about the first set of health parameters associated with the driver, to the at least one node of the distributed ledger associated with the MaaS network.

17. The mobility player system according to claim 1, wherein the processor is further configured to determine an identity of a first driver as the occupant in the first vehicle, based on at least one of the determined at least one event.

18. The mobility player system according to claim 1, wherein the processor is further configured to:
transmit a first set of the OBD data and a first set of the occupant data to an external server;
receive a first set of parameters of the plurality of parameters from the external server, based on the transmitted first set of the OBD data and the transmitted first set of the occupant data;
determine a second set of parameters of the plurality of parameters based on a second set of the OBD data and a second set of the occupant data; and
determine the at least one event related to the first vehicle, or related to the occupant of the first vehicle, based on the application of the trained AI model on the received first set of parameters and the second set of parameters of the plurality of parameters.

19. A method, comprising:
on a mobility player system:
receiving on-board diagnostic (OBD) data associated with a first vehicle, wherein the first vehicle is registered with a first mobility provider;
receiving occupant data, different from the OBD data, from a plurality of sensors associated with the first vehicle;
determining a plurality of parameters based on the received OBD data and the received occupant data, wherein the determined plurality of parameters include information related to an overcapacity of occupants in the first vehicle;
applying a trained artificial intelligence (AI) model on the determined plurality of parameters, wherein the trained AI model includes at least one of: at least one trained machine learning model or at least one trained neural network model;
determining at least one event related to the first vehicle, or related to an occupant of the first vehicle, based on the application of the trained AI model on the determined plurality of parameters; and
transmitting information about the determined at least one event to at least one node of a distributed ledger associated with a Mobility-as-a-Service (MaaS) network.

20. A non-transitory computer-readable medium having stored thereon computer implemented instructions that, when executed by a mobility player system, causes the mobility player system to execute operations, the operations comprising:
receiving on-board diagnostic (OBD) data associated with a first vehicle, wherein the first vehicle is registered with a first mobility provider;
receiving occupant data, different from the OBD data, from a plurality of sensors associated with the first vehicle;
determining a plurality of parameters based on the received OBD data and the received occupant data, wherein the determined plurality of parameters include information related to an overcapacity of occupants in the first vehicle;

applying a trained artificial intelligence (AI) model on the determined plurality of parameters, wherein the trained AI model includes at least one of: at least one trained machine learning model or at least one trained neural network model;

determining at least one event related to the first vehicle, or related to an occupant of the first vehicle, based on the application of the trained AI model on the determined plurality of parameters; and transmitting information about the determined at least one event to at least one node of a distributed ledger associated with a Mobility-As-A-Service (MaaS) network.

\* \* \* \* \*